(12) United States Patent
Hiramoto et al.

(10) Patent No.: US 7,493,638 B2
(45) Date of Patent: Feb. 17, 2009

(54) PROCESSING TERMINAL, RECEIVING TERMINAL AND RECEIVED DATA PROCESSING SYSTEM

(75) Inventors: Takuji Hiramoto, Moriguchi (JP); Satoshi Niwano, Moriguchi (JP); Katsumi Tokuda, Ikeda (JP); Hiroki Murakami, Suita (JP)

(73) Assignee: Panasonic Corporation, Osaka (JP)

( * ) Notice: Subject to any disclaimer, the term of this patent is extended or adjusted under 35 U.S.C. 154(b) by 717 days.

(21) Appl. No.: 11/090,050

(22) Filed: Mar. 28, 2005

(65) Prior Publication Data

US 2005/0240974 A1 Oct. 27, 2005

(30) Foreign Application Priority Data

Mar. 29, 2004 (JP) .............................. 2004-095647

(51) Int. Cl.
*H04N 7/16* (2006.01)
(52) U.S. Cl. ............................ 725/25; 705/41; 710/301; 710/302; 380/210; 380/211; 380/212; 713/150
(58) Field of Classification Search .................. 725/6, 725/25, 100
See application file for complete search history.

(56) References Cited

U.S. PATENT DOCUMENTS 5,999,963 A * 12/1999 Bruno et al. ................ 718/104
6,452,616 B1 * 9/2002 De Vito et al. .............. 715/825
2003/0012378 A1 * 1/2003 Yura .......................... 380/241
2003/0162549 A1 * 8/2003 Carlsson ..................... 455/456
2007/0118596 A1 * 5/2007 Patiejunas .................. 709/203

FOREIGN PATENT DOCUMENTS

JP 2003-116115 4/2003

* cited by examiner

Primary Examiner—Vivek Srivastava
Assistant Examiner—Fred Peng
(74) Attorney, Agent, or Firm—Wenderoth, Lind & Ponack, L.L.P.

(57) ABSTRACT

An IC card (processing terminal) divides a process into process blocks, and holds a time period required for processing each process block. A receiver (receiving terminal) notifies the IC card of a time period which can be spent for processing non-real-time process data when causing the IC card to perform the processing. The IC card processes the process blocks which can be processed within the notified time period. After the processing, the IC card once sends a response back to the receiver, and then transitions into a state in which it can receive a new request. Accordingly, it becomes possible for the IC card to process real-time process data such as an ECM. In the case where the receiver continues the suspended processing, it notifies the IC card of the continuation of the processing so that it causes the IC card to continue the processing of non-real-time process data.

27 Claims, 18 Drawing Sheets

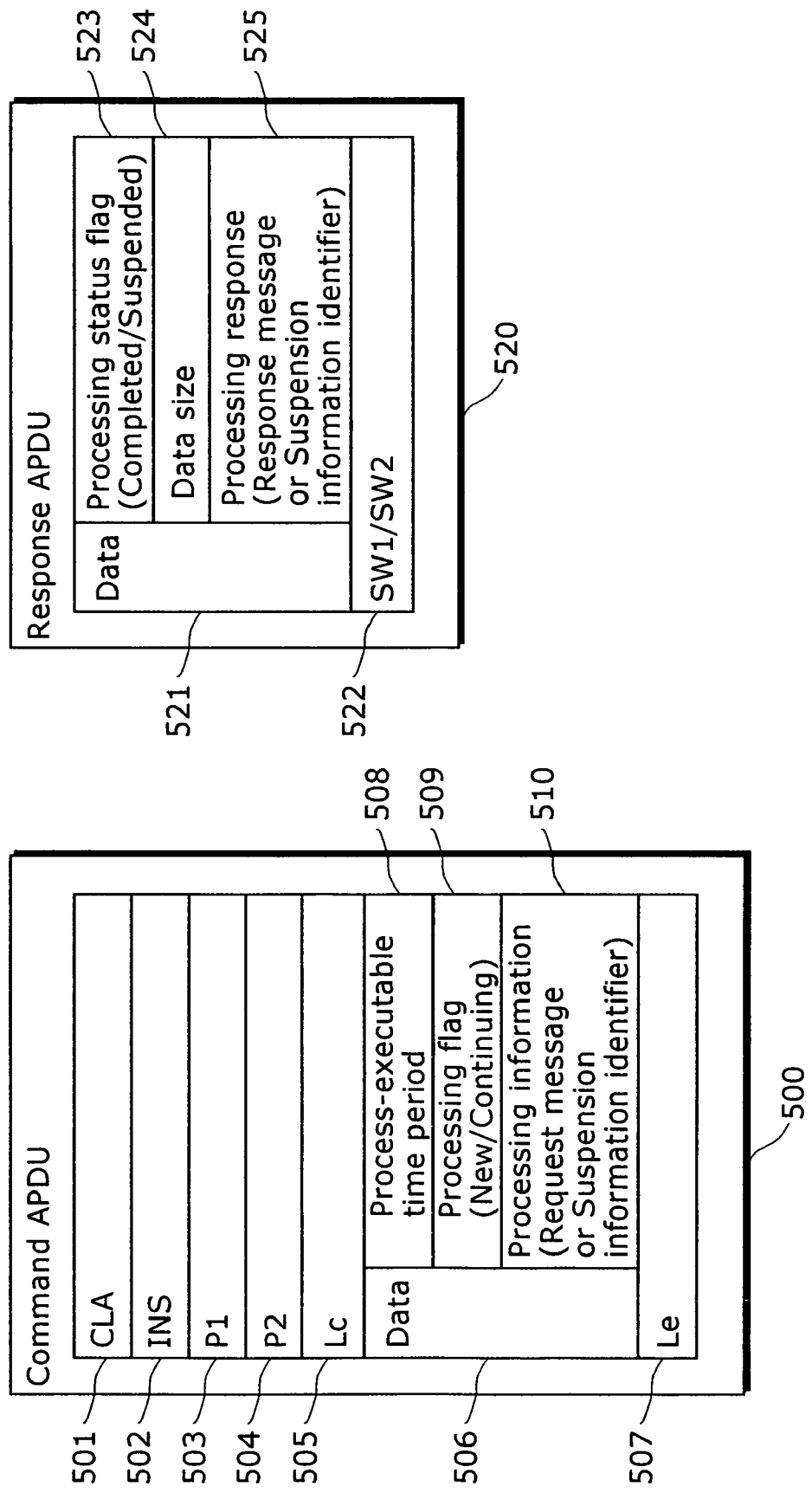

PROCESSING TERMINAL, RECEIVING TERMINAL AND RECEIVED DATA PROCESSING SYSTEM

BACKGROUND OF THE INVENTION (1) Field of the Invention

The present invention relates to a digital content reproduction apparatus and a method of performing two or more types of processing while switching them in a single task device such as an IC card.

(2) Description of the Related Art

In recent years, content distribution services, in which digital contents (hereinafter referred to as "contents") such as music, video and game software can be distributed from a server to a receiver via communication like the Internet, digital broadcast, cable television (CATV) and the like and used on the receiver, have come into practical use.

As services for distributing contents via broadcast, pay broadcast services employing a broadcast satellite (BS) and a communication satellite (CS) have already been in actual use. These services use Conditional Access System (CAS) standardized by Association of Radio Industries and Businesses (ARIB) that is a Japanese organization for standardizing digital broadcasting systems. For detailed description of CAS, see "Digital Houhou ni okeru Access Seigyo Houshiki (Access Control System in Digital Method), version 4.1", ARIB, 2003 (Non-patent literature 1).

Under the current CAS, a broadcaster distributes encrypted contents. When receiving an encrypted content, the receiver obtains a key for decrypting the content from the IC card inserted into the receiver, decrypts the content, and views the content. In this CAS, a time-change key system is used in which an encryption key is updated on a regular basis. Therefore, the receiver needs to obtain the decryption key from the IC card at every timing when the key is updated.

By the way, IC cards have been used recently in services such as authentication and electronic money which require security, as tamper-resistance of the IC cards have been improved and storage capacity thereof have been increased. In addition, server-type broadcasting services, namely, a type of user-friendly content usage, are under consideration, in which the contents which are previously distributed under the above ARIB standard are stored in the receiver once and a user views the content that the user wants to view when he/she feels like viewing.

In order to use these various services, the user has to insert the IC card specific to each service into the receiver every time he/she uses it, which is inconvenient to the user. Therefore, as a method of processing multiple services with a single IC card, a multi-application card like a Java card has been suggested. Using this multi-application card, all that the user has to do in order to use various services is insert only one IC card into the receiver, which is very convenient to the user.

By the way, an IC card which is currently distributed operates as a single task device. In other words, an IC card is a device which starts the processing when accepting the processing request from the receiver into which the IC card is inserted, and sends a response back to the receiver and terminates the processing when completing the processing. While such a single task device is performing one type of processing, the receiver cannot have the device perform another type of processing.

For example, it is assumed that an IC card performs the processing regarding security in a content distribution system. Generally speaking, the processing regarding security requires high load processing such as encryption processing and interpretation of copyright information. Therefore, if the IC card performs such processing, it is assumed that it takes a long time to complete the processing and the receiver cannot send a new processing request to the IC card during that processing.

By the way, CAS currently in use employs a time-change key for encrypting contents. Therefore, in the case where the IC card performs the above-mentioned time-consuming processing, there is a problem that a decryption key cannot be obtained from the IC card at the timing when the decryption key is updated and thus the content cannot be decrypted. In other words, in the case where the IC card performs the processing which needs to be performed in real time and the processing which takes a long time to be performed while switching between them, there is a problem that it could be impossible to perform the real-time processing.

SUMMARY OF THE INVENTION

The present invention has been conceived in view of these problems, and it is an object of the present invention to make it possible for a single task device such as an IC card to perform the processing which needs to be performed in real time and the processing which takes a long time to be performed by switching between them.

In order to achieve the above object, the processing terminal of the present invention is a processing terminal in a received data processing system including a receiving terminal and the processing terminal, the received data processing system being intended for receiving real-time process data at a predetermined timing and processing the real-time process data in real time, and for processing non-real-time process data in between the real-time processing, the real-time process data being data which needs to be processed in real time, and the non-real-time process data being data which does not need to be processed in real time, the processing terminal including: a communication unit operable to receive the real-time process data and the non-real-time process data from the receiving terminal; and a processing unit operable to process as much of the non-real-time process data as possible within a time period which can be spent for processing of the non-real-time process data, wherein the communication unit is operable to send a result of the non-real-time processing performed within the time period back to the receiving terminal.

The receiving terminal of the present invention is a receiving terminal in a received data processing system including the receiving terminal and a processing terminal, the received data processing system being intended for receiving real-time process data at a predetermined timing and processing the real-time process data in real time, and for processing non-real-time process data in between the real-time processing, the real-time process data being data which needs to be processed in real time, and the non-real-time process data being data which does not need to be processed in real time, the receiving terminal including: a receiving unit operable to receive real-time process data and non-real-time process data from an external apparatus; a non-real-time processing time calculation unit operable to calculate a time period which can be spent for processing of the non-real-time process data; and a sending unit operable to send the real-time process data and the non-real-time process data to the processing terminal.

According to the present invention, it becomes possible to use a variety of services employing CAS and communication networks with only one IC card and to reduce the costs for the receiver, and thus user convenience is increased.

Note that the present invention can not only be embodied as such a receiving terminal or a processing terminal, but also as a program for causing a computer to execute the characteristic units included in the receiving terminal or the processing terminal, as functions, as a received data processing method including the characteristic units included in the receiving terminal or the processing terminal, as steps, or as a medium including data used for these characteristic units included in the terminal device. It is needless to say that the program can be distributed via a storage medium such as a CD-ROM or a transmission medium such as the Internet.

BRIEF DESCRIPTION OF THE DRAWINGS

FIG. 5A is a diagram showing a data structure of a request command APDU (Application Protocol Data Unit) which is sent from the receiver to the IC card. FIG. 5B is a diagram showing a data structure of a response command APDU which is sent from the IC card to the receiver.

DESCRIPTION OF THE PREFERRED EMBODIMENT(S)

A description of an embodiment of the present invention is given below with reference to the diagrams.

Figure 1:
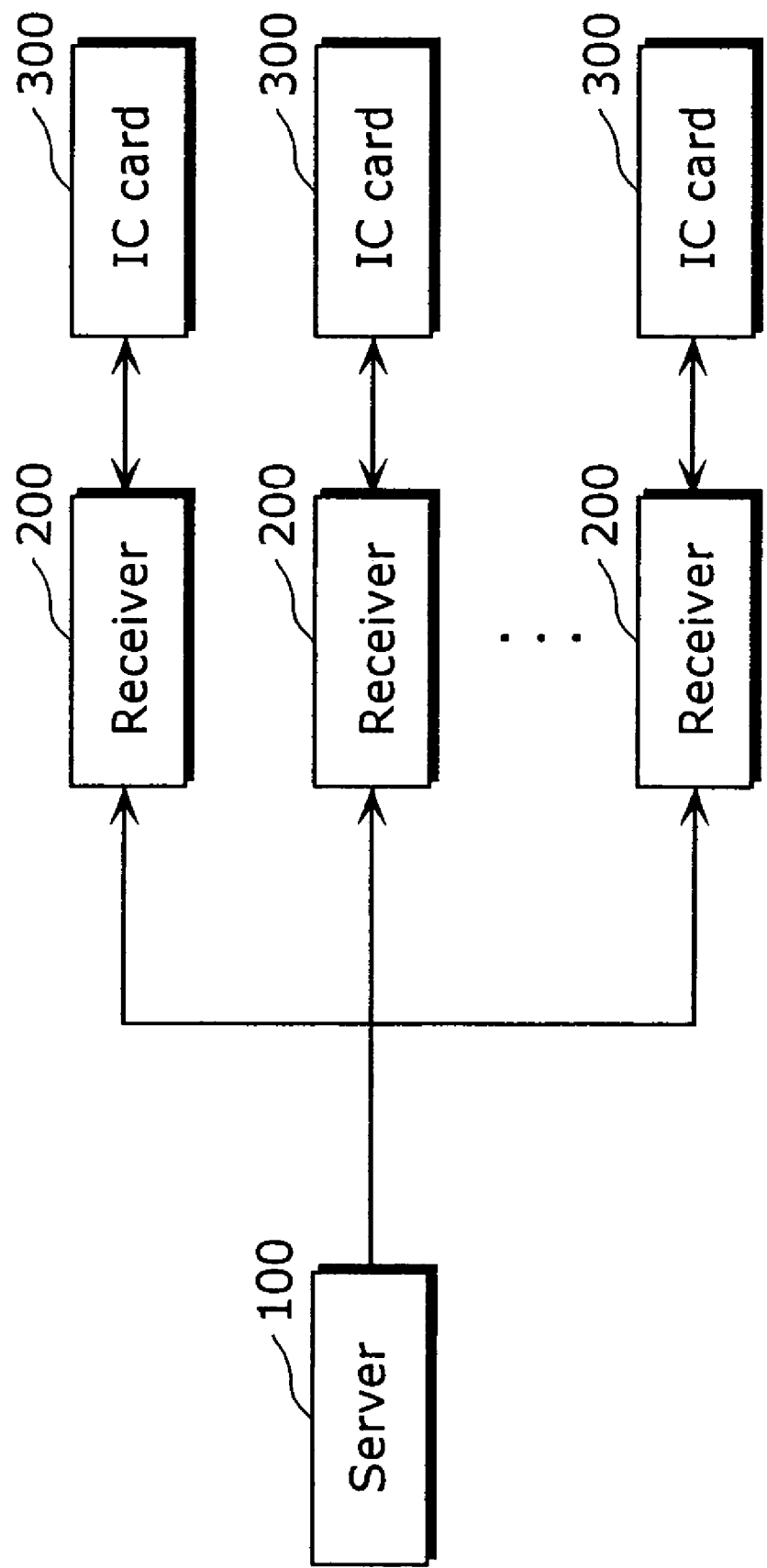
FIG. 1 is a block diagram showing an overall configuration of a content distribution system in an embodiment of the present invention.

FIG. 1 is a block diagram showing an overall configuration of a content distribution system in the embodiment of the present invention. The content distribution system disclosed here is a system in which a receiver reproduces a content stored in itself or reproduces a content received via a communication network while receiving an encrypted content via digital broadcast, and includes a server 100, a receiver 200 and an IC card 300. The server 100 distributes encrypted contents. The receiver 200 receives the content distributed from the server 100, decrypts the encrypted content using a scramble key obtained from the IC card 300 and views the content. It obtains the scramble key distributed together with the content and sets it in the receiver 200. For example, the receiver 200 and the IC card 300 of the present embodiment constitute a system in which a content stored in the receiver 200 is reproduced according to a usage rule of license information and a encrypted content distributed via digital broadcast is recorded during the reproduction of the stored content.

Figure 2:
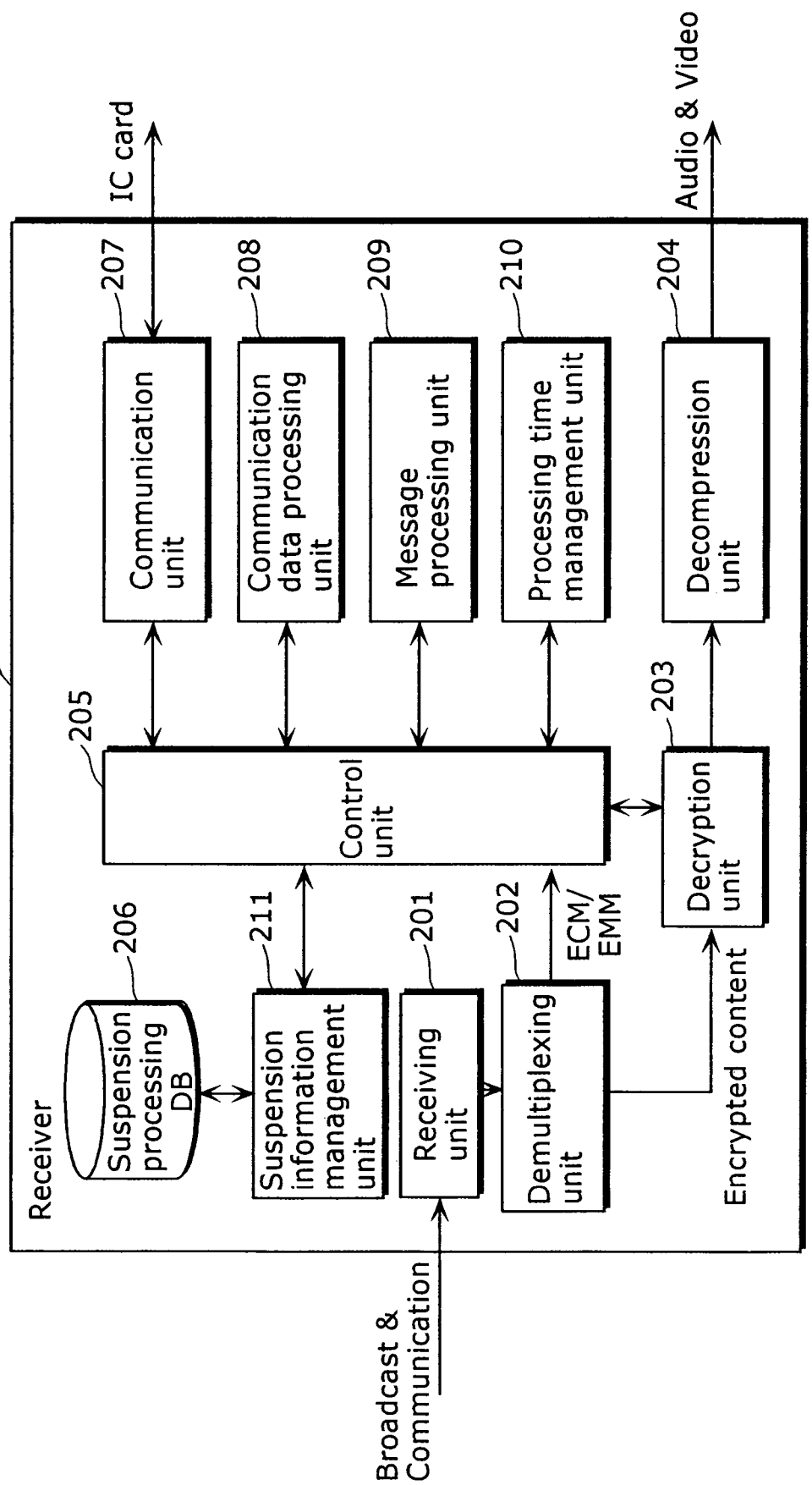
FIG. 2 is a block diagram showing an internal structure of a receiver in the embodiment of the present invention.

FIG. 2 is a block diagram showing an internal structure of the receiver 200 in the embodiment of the present invention.

The receiver 200 is a receiver which receives encrypted contents, data to be processed in the IC card 300 and the like via digital broadcast and a communication network, and includes a receiving unit 201, a demultiplexing unit 202, a decryption unit 203, a decompression unit 204, a control unit 205, a suspension processing DB 206, a communication unit 207, a communication data processing unit 208, a message processing unit 209, a processing time management unit 210 and a suspension information management unit 211. The receiving unit 201 receives encrypted contents distributed via broadcast, communication or the like. The demultiplexing unit 202 demultiplexes a transmission stream in which MPEG-2 TS audio and video data and the like received by the receiving unit 201 are multiplexed. The decryption unit 203 decrypts encrypted contents and the like. The decompression unit 204 decompresses the audio and video data compressed according to MPEG-2 or the like. The control unit 205 controls each function unit of the receiver. The suspension processing DB 206 holds the processing which is suspended in the IC card 300. The communication unit 207 communicates with the IC card 300. The communication data processing unit 208 processes communication data which is compliant with ISO7816-4 that is a standard defining a communication protocol for IC cards. The message processing unit 209 processes messages which are sent and received to and from the IC card 300. The processing time management unit 210 manages a time period in which the IC card 300 can perform the processing. The suspension information management unit 211 manages a suspension information identifier table held in the suspension information DB 206.

Figure 3:
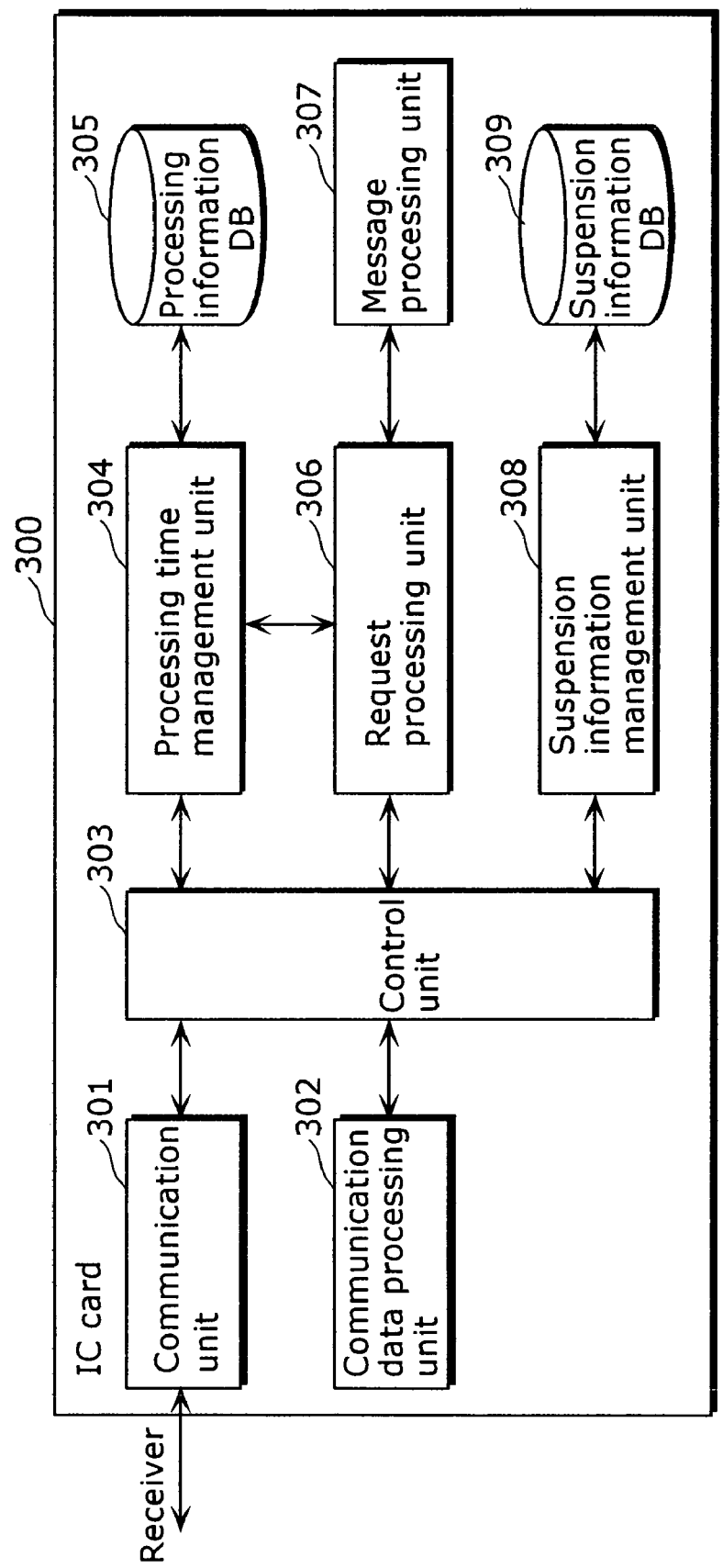
FIG. 3 is a block diagram showing an internal structure of an IC card in the embodiment of the present invention.

FIG. 3 is a block diagram showing an internal structure of the IC card 300 in the embodiment of the present invention.

The IC card 300 is a secure terminal device which processes data which needs to be processed securely, among the data received by the receiver 200, and includes a communication unit 301, a communication data processing unit 302, a control unit 303, a processing time management unit 304, a processing information DB 305, a request processing unit 306, a message processing unit 307, a suspension information management unit 308 and a suspension information DB 309. Here, the processing which needs to be processed securely is, for example, the processing for extracting a content key for decrypting an encrypted content from the license information received by the receiver 200, decrypting a scramble key from multiplexed data of digital broadcast, or the like. The data which needs to be processed securely is, for example, license information including a content key and usage rules, an entitlement management message (EMM) including an encrypted work key, an entitlement control message (ECM) including an encrypted scramble key, and the like. The communication unit 301 communicates with the receiving unit 200. The communication data processing unit 302 processes communication data which is compliant with ISO7816-4 that is a standard defining a communication protocol for IC cards. The control unit 303 controls each function unit of the IC card 300. The processing time management unit 304 manages a time period in which the IC card 300 can execute non-real-time processing which does not need to be executed in real time. The processing information DB 305 holds information of time required for the IC card 300 to execute various types of processing. The request processing unit 306 processes a request from the receiver 200. The message processing unit 307 processes a message which is sent and received to and from the receiver 200. The suspension information management unit 308 holds and restores the status of the processing which is suspended midway through the execution thereof. The suspension information DB 309 holds the internal state of various types of suspension processing as suspension information.

Next, a description is given of the structures of messages and communication data used for the communication method between the receiver 200 and the IC card 300 in the embodiment of the present invention.

Figure 4B:
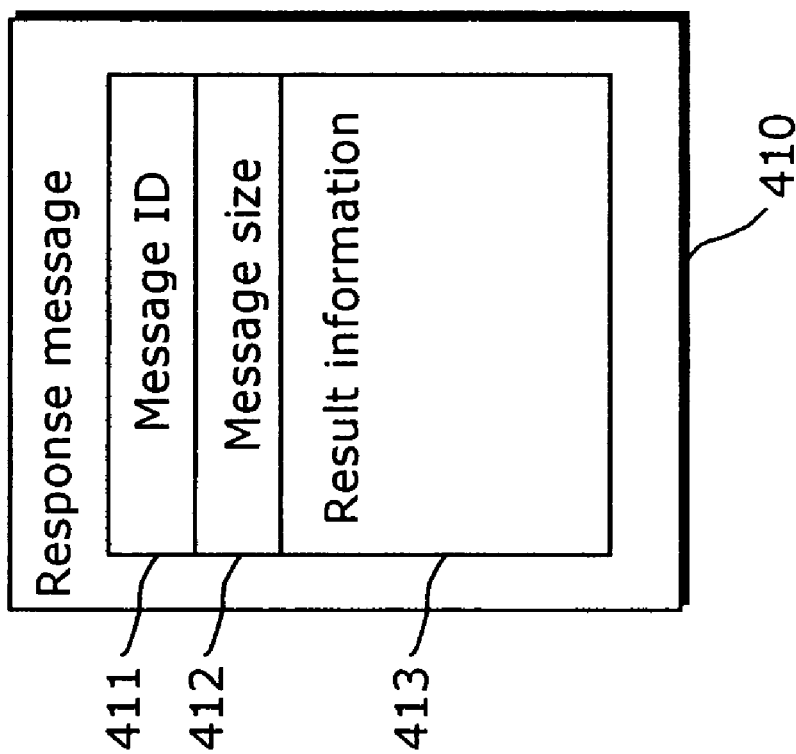
FIG. 4B is a diagram showing one example of a data structure of a response message which is sent from the IC card to the receiver to respond to the request message shown in FIG. 4A.
Figure 4A:
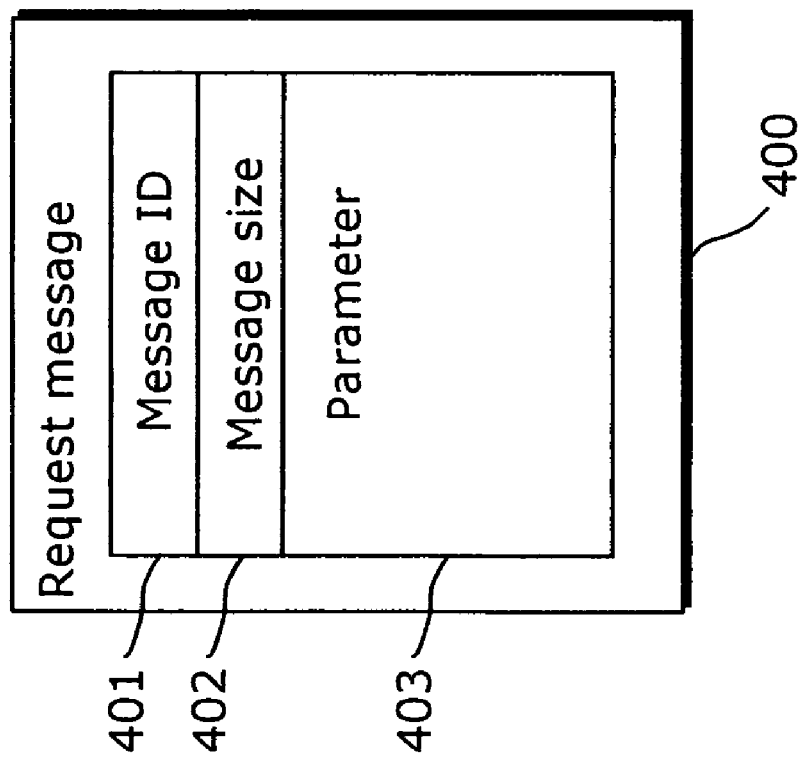
FIG. 4A is a diagram showing one example of a data structure of a request message which is sent from the receiver to the IC card to request the IC card to perform processing.

A description is given of the structure of the messages which are sent and received between the receiver 200 and the IC card 300, with reference to FIGS. 4A and 4B. FIG. 4A is a diagram showing one example of a data structure of a request message which is sent from the receiver 200 to the IC card 300 to request the IC card 300 to perform processing. FIG. 4B is a diagram showing one example of a data structure of a response message which is sent from the IC card 300 to the receiver 200 to respond to the request message shown in FIG. 4A.

A request message 400 which is sent from the receiver 200 to the IC card 300 includes a message ID 401, a message size 402 and a parameter 403. In the item of the message ID 401, a message ID indicating the type of the request message is stored. In the item of the message size 402, data indicating the size of the item of the parameter 403 is stored. In the item of the parameter 403, various parameters required for the request processing are stored.

A response message 410 which is sent from the IC card 300 to the receiver 200 includes a message ID 411, a message size 412 and result information 413. In the item of the message ID 411, a message ID indicating the type of a response message is stored. In the item of the message size 412, data indicating the size of the result information 413 is stored. In the item of the result information 413, the result of the processing performed by the IC card 300 is stored.

Next, a description is given, with reference to FIGS. 5A and 5B, of the structure of communication data which is used for communication between the receiver 200 and the IC card 300. FIG. 5A is a diagram showing a data structure of a request command APDU 500 which is sent from the receiver 200 to the IC card 300.

The request command APDU 500 which is sent from the receiver 200 to the IC card 300 includes CLA 501, INS 502, P1 (503), P2 (504), Lc 505, a data area 506 and Le 507. The CLA indicates how much a command to be sent is compliant with the data structure defined by ISO7816-4. The INS 502 indicates the type of the command. P1 (503) stores the parameters for the command. The Lc 505 stores the size of the data area 506. The data area 506 stores various data required for the request processing. The Le 507 stores the size of the response commend which is expected to be received as a response to the command to be sent.

The CLA 501 to the Le 507 are the elements of the data structure defined as a command APDU under ISO7816-4. The data area 506 of the command APDU 500 in the present embodiment further includes a process-executable time period 508, a processing flag 509 and processing information 510. The process-executable time period 508 stores the time period in which the IC card 300 can execute non real-time processing. The processing flag 509 stores a flag specifying which the command APDU 500 indicates, the instruction to start new processing or the instruction to continue suspended processing. The item of the processing information 510 stores the information required for the IC card 300 to perform the processing. The processing information 510 stores the request message 400 in the case where the processing flag 509 specifies the instruction to start new processing, and stores the suspension information identifier of the suspended processing to be continued in the case where the flag 509 specifies the instruction to continue that processing.

FIG. 5B is a diagram showing the data structure of a response command APDU 520 which is sent from the IC card 300 to the receiver 200. Next, the response APDU 520 which is sent from the IC card 300 to the receiver 200 includes a data area 521 and SW1/SW2 (522). The data area 521 stores various types of information which are the results of the processing performed by the IC card 300. The SW1/SW2 (522) stores the processing status of the IC card 300.

The data area 521 and the SW1/SW2 (522) are the elements of the data structure defined as a response APDU under ISO7816-4. The data area 521 of the response APDU 520 in the present embodiment further includes a processing status flag 523, a data size 524 and a processing response 525. The processing status flag 523 notifies the processing status in the IC card 300 as "processing completed/processing suspended". The data size 524 stores the size of the processing response 525. The processing response 525 stores the result of the processing performed by the IC card 300. Here, the processing response 525 stores the response message 410 to the processing in the case where the "processing completed" is stored in the processing status flag 523, and stores the suspension processing identifier for identifying the suspended processing in the case where the "processing suspended" is stored.

Figure 6:
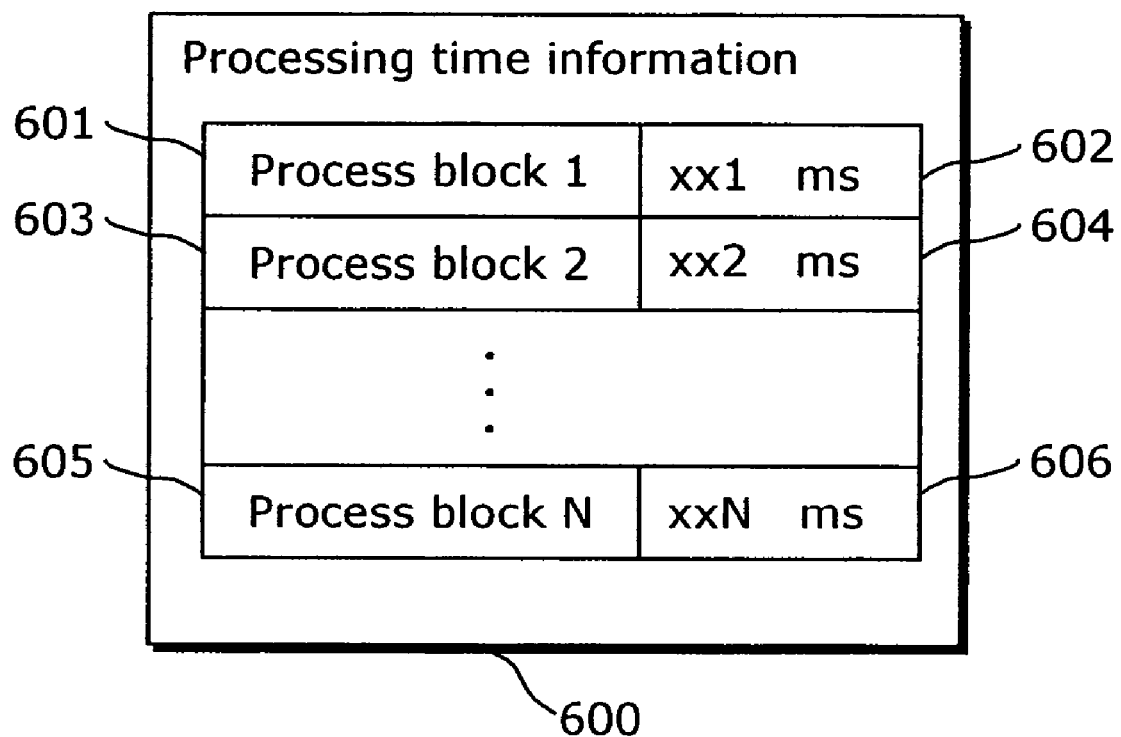
FIG. 6 is a diagram showing one example of a table on which time required for processing each of process blocks is recorded in the case where non-real-time processing is divided into the process blocks.

Next, a description is given of the time information of the processing required for dividing the processing based on time, with reference to FIG. 6. FIG. 6 is a diagram showing one example of a table on which time required for processing each of process blocks into which non real-time processing is divided.

Processing time information 600 is one example of a table for managing the time required for the processing performed in the IC card 300. The IC card 300 manages, as the processing time information 600, each process block required for performing the non real-time processing and the time required for that processing. More specifically, it manages the time information of each process block such as the information indicating that the time required for the processing of the process block 1 (601) is xx1 ms (602), for example, 80 ms, the time required for the process block 2 (603) is xx2 ms (604), for example, 40 ms, . . . , the time required for the process block N 605 is xxN ms (606).

It becomes possible for the IC card 300 to judge whether or not the processing of the process block to be processed will be finished within an estimated time period, by referring to the processing time information 600. For example, it can be judged, in the case where the processing of only 100 ms is to be performed, that the process block 1 of 80 ms can be processed, but the process block 2 of 40 ms cannot be processed following the processing of the process block 1. The IC card 300 holds this time management information 600 in the processing information DB 305 in itself.

Next, a description is given of a method of managing the suspension information required for the receiver 200 and the IC card 300 to manage the processing suspended in the IC card 300.

Figure 7:
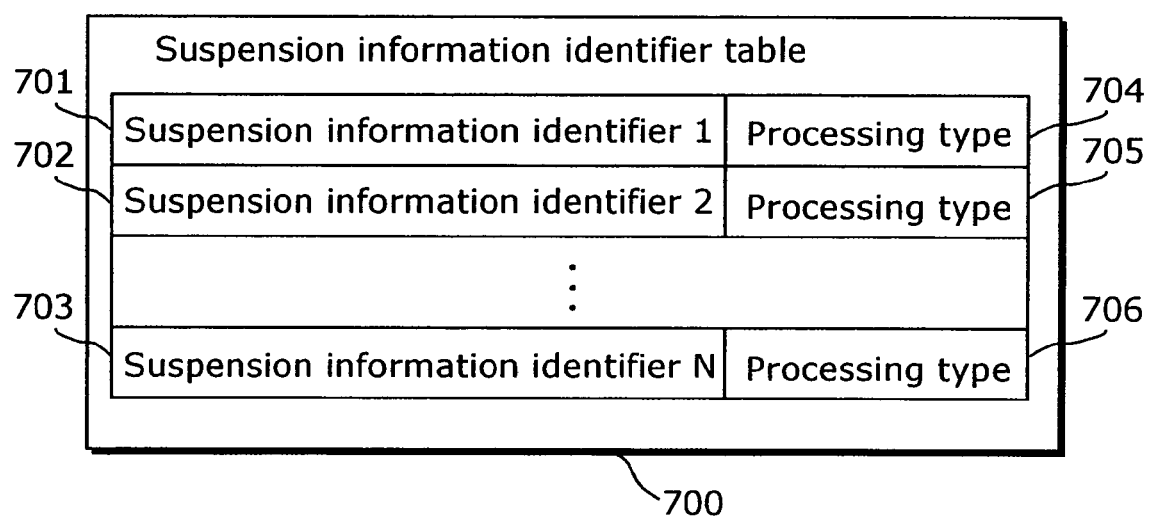
FIG. 7 is a diagram showing one example of a suspension information identifier table which is held in a suspension processing DB in the receiver.

FIG. 7 is a diagram showing one example of a suspension information identifier table which is held in the suspension processing DB 206 of the receiver 200. First, the suspension information held in the receiver 200 is described with reference to FIG. 7.

In the case where the IC card 300 suspends the processing, the receiver 200 holds, in the suspension information identifier table 700, the suspension information identifier issued by the IC card 300 for the suspension processing. More specifically, the suspension information identifier table 700 includes suspension identifiers 701 to 703 issued by the IC card 300 for suspension processing and processing types 704 to 706 for identifying the types of respective suspended processing. The receiver 200 holds this suspension information identifier table 700 in the suspension processing DB 206.

Figure 8:
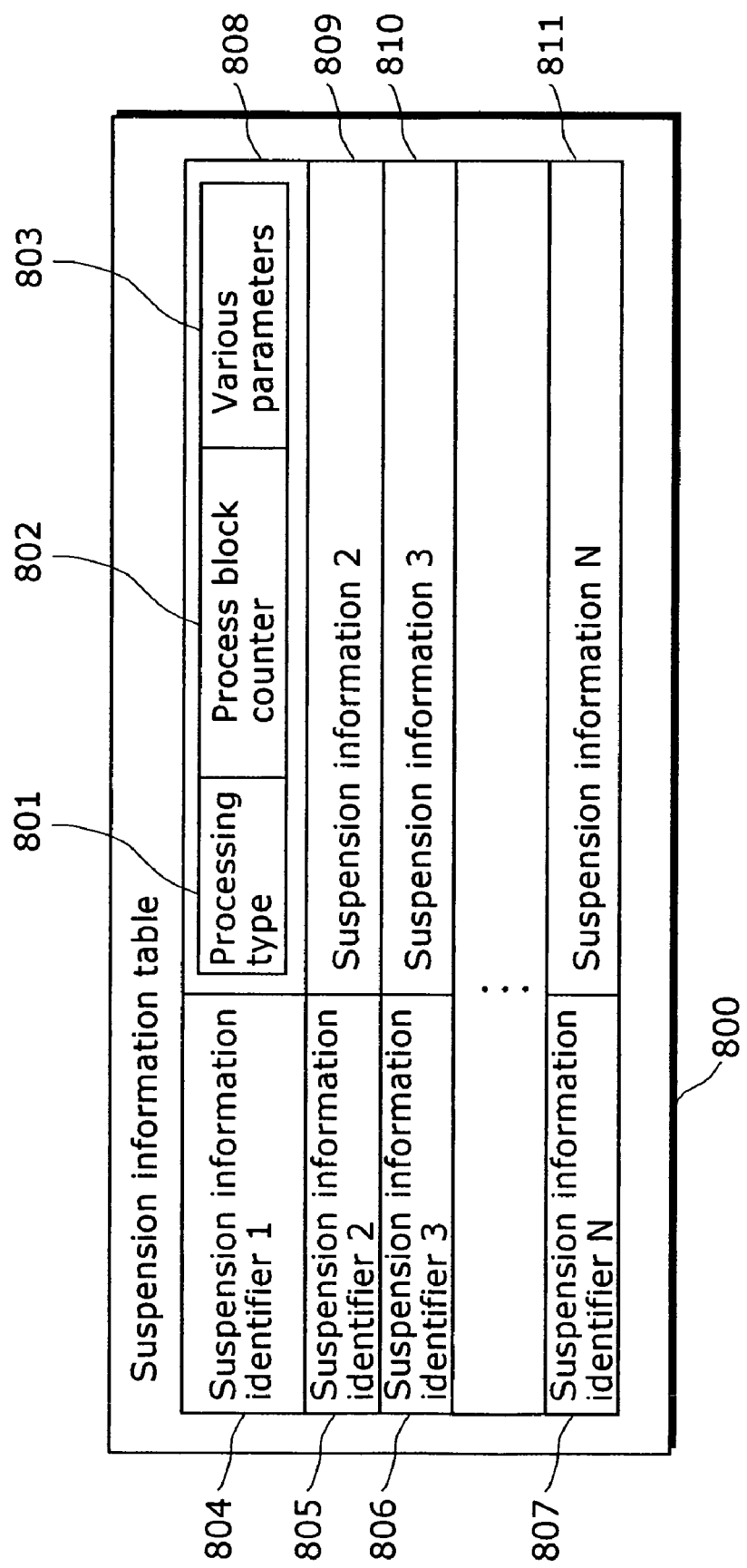
FIG. 8 is a diagram showing one example of a suspension information table which is held in a suspension information DB in the IC card.

FIG. 8 is a diagram showing one example of the suspension information table which is held in the suspension information DB 309 in the IC card 300. Next, the suspension information held in the IC card 300 is described with reference to FIG. 8.

The IC card 300 holds the internal state in the case where non real-time processing is suspended, as well as the suspension information identifier in association with each other, as a suspension information table 800. The suspension information table 800 includes suspension information identifiers 804 to 807 and suspension information 808 to 811 corresponding to the respective suspension information identifiers. Each of the suspension information 808 to 811 includes, for example, a processing type 801 indicating the type of suspended processing, a process block counter 802 indicating the number of the block to be processed next, and various parameters 803 which are other internally held parameters. The position at which non real-time processing is suspended in the IC card 300, namely, which process blocks have already been executed, is indicated by the count number of the process block counter 802. The IC card 300 holds this suspension information table 800 in the suspension information DB 309 in itself.

A description is given of a method of performing real-time processing and non real-time processing while switching between them in the IC card 300 using the above-mentioned constituent elements. It is described later in detail, but the processing for obtaining a decryption key in CAS is described here, as an example of the real-time processing which needs to be performed in the IC card 300 on a regular basis. Hereinafter, this processing is referred to as CAS real-time processing.

Figure 9:
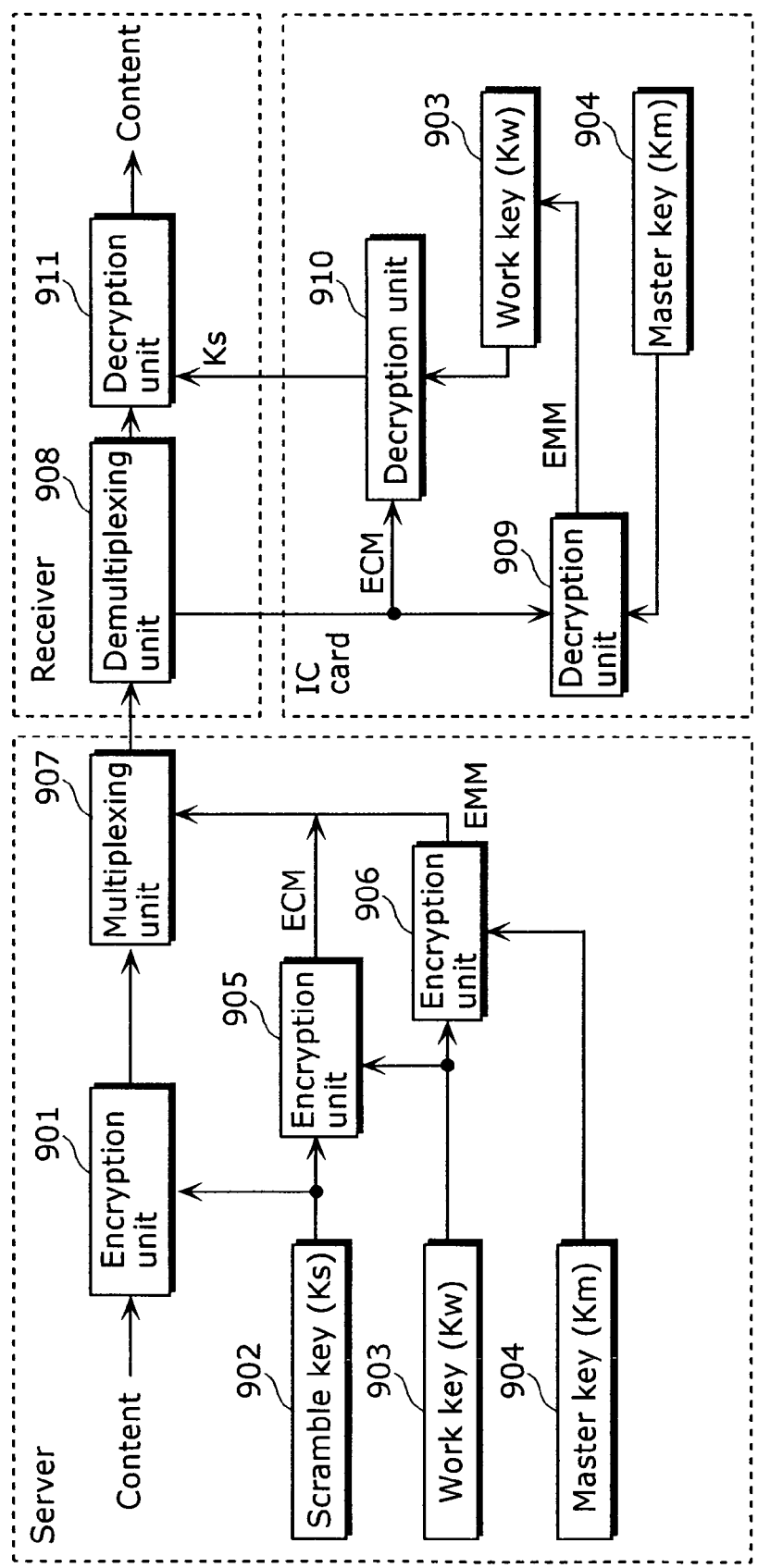
FIG. 9 is a diagram showing a data flow in the case where the receiver decrypts an encrypted content distributed from a server under CAS.

FIG. 9 is a diagram showing a data flow in the case where the receiver decrypts an encrypted content distributed from the server in CAS. First, CAS real-time processing is described with reference to FIG. 9. Note that it suffices to describe the outline of the CAS real-time processing, and the detailed operations of the receiver 200 and the IC card 300 are not described here.

It is assumed that the server 100 and the IC card 300 hold in advance a master key 904 (hereinafter referred to as "Km") that is a common secret key. First, before encrypting and distributing a content, the encryption unit 906 in the server 100 encrypts an EMM storing a work key 903 (hereinafter referred to as "Kw") using the Km 904, and the multiplexing unit 907 multiplexes the encrypted EMM on a transmission stream of MPEG-2 TS or the like, and distributes it.

The demultiplexing unit 908 in the receiver 200 demultiplexes the encrypted EMM from the received transmission stream, and sends it to the IC card 300. The IC card 300 decrypts the EMM using the Km 904 held in the decryption unit 909, obtains the Kw 903 and holds it.

Next, the server 100 stores the scramble key 902 (hereinafter referred to as "Ks") that is a key for encrypting contents into an ECM, and the encryption unit 905 encrypts the content using the Kw 903. The server 100 performs the above-mentioned processing every time the Ks 902 is updated on a regular basis (for example, every two seconds). Next, after encrypting the ECM, the encryption unit 901 in the server 100 encrypts the content using the Ks 902. Then, the multiplexing unit 907 multiplexes the ECM encrypted by the encryption unit 905 and the content encrypted by the encryption unit 901, and distributes them.

After the receiver 200 receives the transmission stream, the demultiplexing unit 908 demultiplexes it into the encrypted ECM and the encrypted content, and sends the encrypted ECM to the IC card 300. The decryption unit 901 in the IC card 300 decrypts the encrypted ECM using the obtained Kw 903, and sends the Ks 902 stored in the encrypted ECM back to the receiver 200. The decryption unit 911 in the receiver 200 decrypts the encrypted content using the Ks 902 obtained from the IC card 300. The above-mentioned processing is performed every time the Ks 902 is updated on a regular basis. Therefore, in the case where the processing for obtaining the Ks 902 cannot be performed because the IC card 300 is performing some other processing, the receiver 200 cannot decrypt the content.

Figures 10A, 10B:
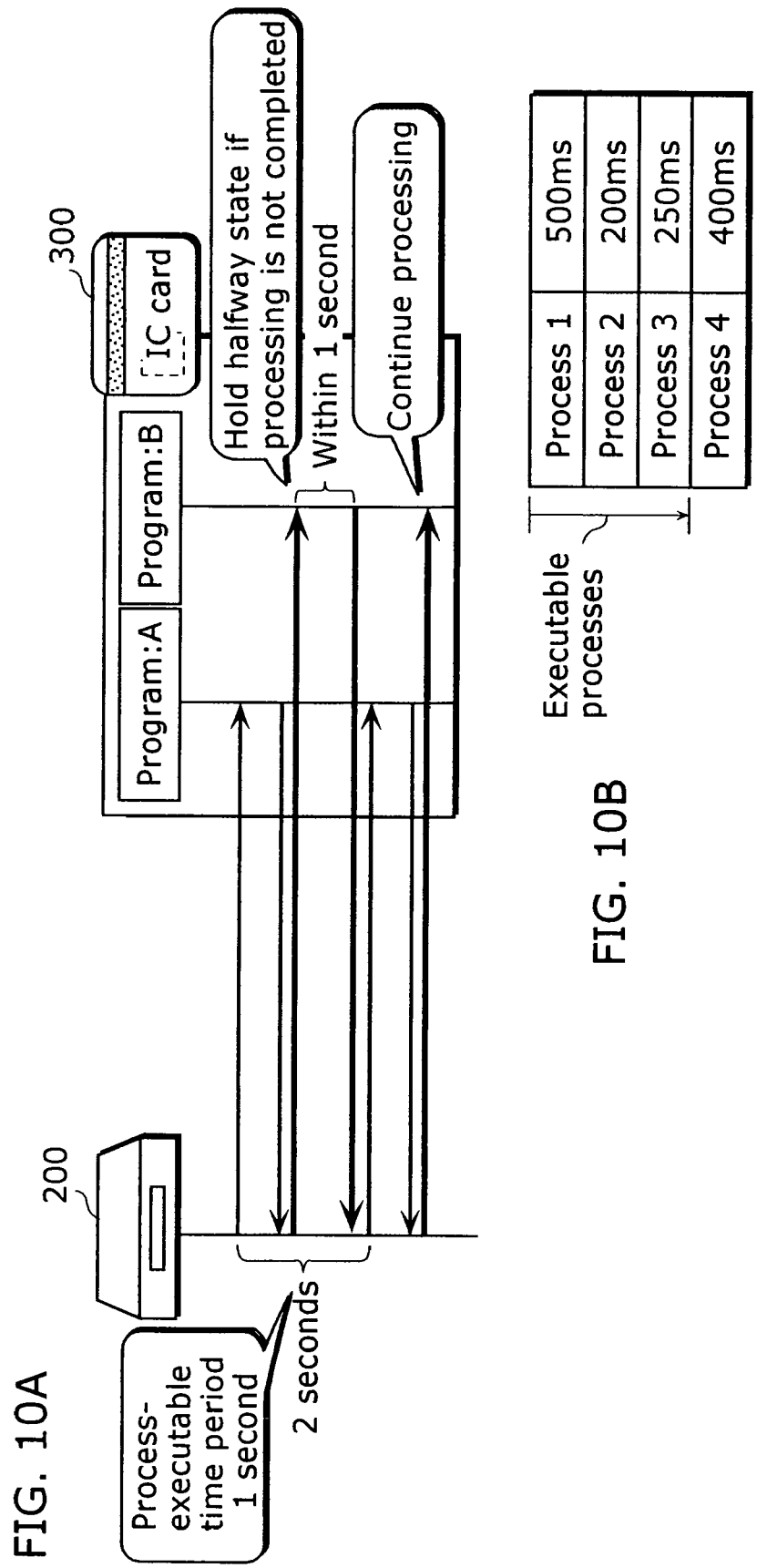
FIG. 10A and FIG. 10B are diagrams showing an outline of operations of the IC card in the case the IC card performs non-real-time processing in between real-time processing.

FIG. 10A and FIG. 10B are diagrams showing the outline of the operations of the IC card 300 in the case where the IC card 300 performs non-real-time processing in between real-time processing. In FIG. 10A, exchange of real-time process data between the receiver 200 and the IC card 300 is represented by thin solid lines, and exchange of non-real-time process data is represented by thick solid lines. As shown in FIG. 10A, a program A for processing the real-time process data and a program B for processing the non-real-time process data are installed into the IC card 300. As already described with reference to FIG. 9, the server 100 updates the Ks 902 on a regular basis (for example, every two seconds), so the receiver 200 receives the encrypted ECM every two seconds. The receiver 200 sends the received encrypted ECM to the IC card 300, decrypts the encrypted ECM using Kw, and sends a request command requesting the return of the scramble key Ks. Generally speaking, the maximum processing time required for real-time processing of the program A is defined to be within one second including the time for the receiver 200 to send the request command to the IC card 300 and the time for the IC card 300 to return the Ks, as a response to the request command, to the receiver 200. Therefore, in this case, the time period which the program can spend for processing non real-time process data is about one second up to the reception of the next ECM. Note that in the case where the time required for the real-time processing of this program A is not defined to be within one second, the time which is previously stored in the receiver 200 and can be used for the receiver 200 to perform non real-time processing shall be calculated as the time required for this real-time processing, and notified to IC card 300. As shown by the thick arrow in FIG. 10A, in the case where the program B cannot execute and complete the processing of the non-real-time process data requested by the receiver 200 within one second or the time notified by the receiver 200, it suspends the processing halfway, hands over the control to the program A so as to cause the program A to execute the next real-time processing. In this case, the program B holds the internal state at the time of the suspension, and when the program A completes the real-time processing, the program B restores the internal state at the time of the suspension and continues the remaining non-real-time processing. For example, as shown in FIG. 10B, in the case where the non-real-time process data can be divided into four process blocks 1 to 4, the program B can execute the processing up to the process 3 per second. It judges that it cannot execute the next process 4 at the stage where it completes up to the process 3, and suspends the non-real-time processing. In this case, the program B holds the state in which the processing has been completed up to the process 3, and when the program A completes the real-time processing, it restores the internal state at the time of the completion of the process 3 and starts executing the process 4.

Figure 11:
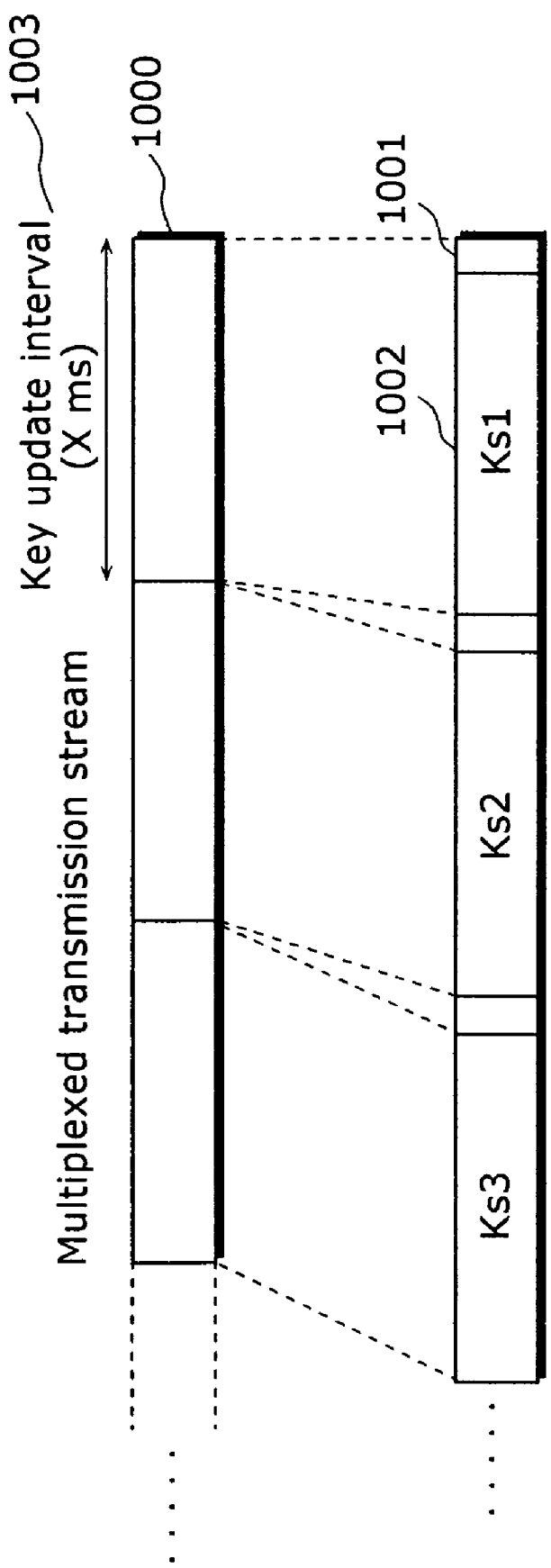
FIG. 11 is a diagram schematically showing a data structure of a transmission stream in which an encrypted ECM and an encrypted content are multiplexed.

FIG. 11 is a diagram schematically showing a data structure of a transmission stream in which an encrypted ECM and an encrypted content are multiplexed. Next, a structure of a transmission stream in which an encrypted ECM and an encrypted content are multiplexed is described with reference to FIG. 11.

A transmission stream 1000 to be multiplexed and transmitted to the receiver 200 includes an encrypted ECM and a part of the content encrypted using the Ks 902 stored in the encrypted ECM. Since the Ks 902 is a time-change key which changes on a regular basis, the transmission stream 1000 includes content blocks depending on the Ks 902. More specifically, each content block includes, for example, an encrypted ECM 1001 storing Ks1 as Ks 902 and an encrypted content block 1002 that is a part of the content encrypted using Ks1. In other words, in the case where the receiver 200 fails to obtain the Ks 902, it cannot decrypt the content properly for a time period X ms that is a key update interval 1003.

Figure 12:
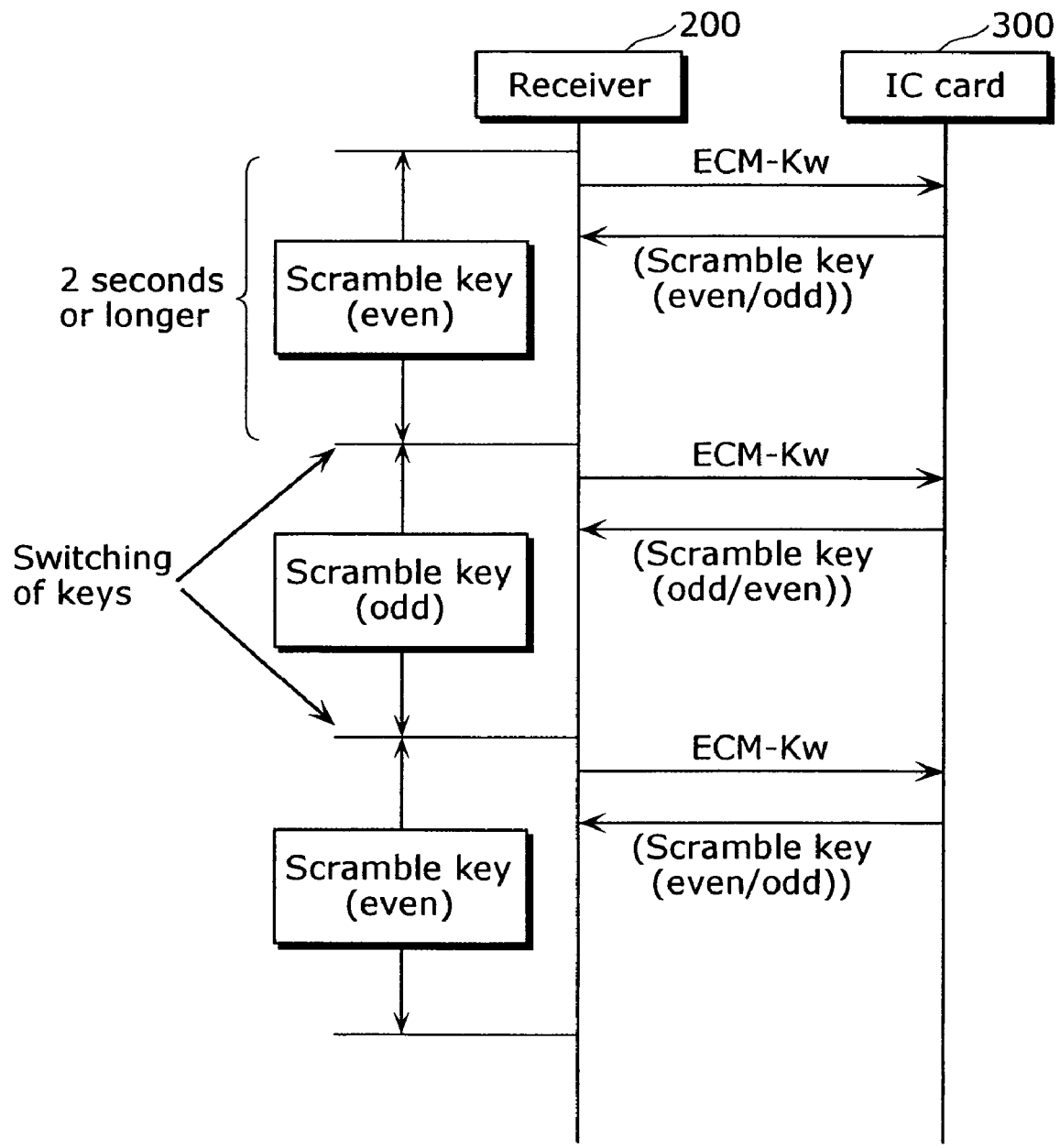
FIG. 12 is a diagram showing relations of timing between the encrypted content in the transmission stream and ECM processing for updating Ks.

FIG. 12 is a diagram showing relations of timing between the encrypted content in the transmission stream and ECM processing for updating Ks. The blocks of Scramble key (even), Scramble key (odd), Scramble key (even), . . . in the left side of FIG. 12 respectively represent encrypted contents in the transmission scream, and it shows that the contents are encrypted by the scramble key (even), the scramble key (odd) and the scramble key (even), respectively. Also in this diagram, the response from the IC card 300 to the receiver 200 show that both the scramble keys (even) and (odd) are decrypted in one ECM processing. In other words, one encrypted ECM includes two Ks, and one ECM processing allows reproduction of contents for about four seconds in total, that is, about two seconds for the content encrypted by the scramble key (even) and about two seconds for the content encrypted by the scramble key (odd). However, in the case where the scramble keys (odd) and (even) which are sent in the next encrypted ECM cannot be received or decrypted, when the scramble key (even) is updated four seconds later at the time of key change, the following encrypted contents cannot be reproduced until a new ECM is received and decrypted. Note that the change of the scramble key is controlled by the bit of "transport_scrambling_control" in a transport stream (TS) packet. Therefore, the receiver does not need to know the time of updating the scramble key, and it may send the request command for the ECM processing to the IC card 300 every time it detects this bit of the TS packet, and send the request commend for non-real-time processing immediately after receiving the Ks as a response from the IC card 300. Alternatively, it may detect the update of ECM, send the updated ECM to the IC card 200, detect the reception of the response, and send the request command for non-real-time processing.

All that is needed to avoid the above-mentioned problem is that no processing is performed in the IC card 300 at the time of updating a key. Therefore, other non-real-time processing can be performed in between the processing which needs to be performed in real time.

Figure 13:
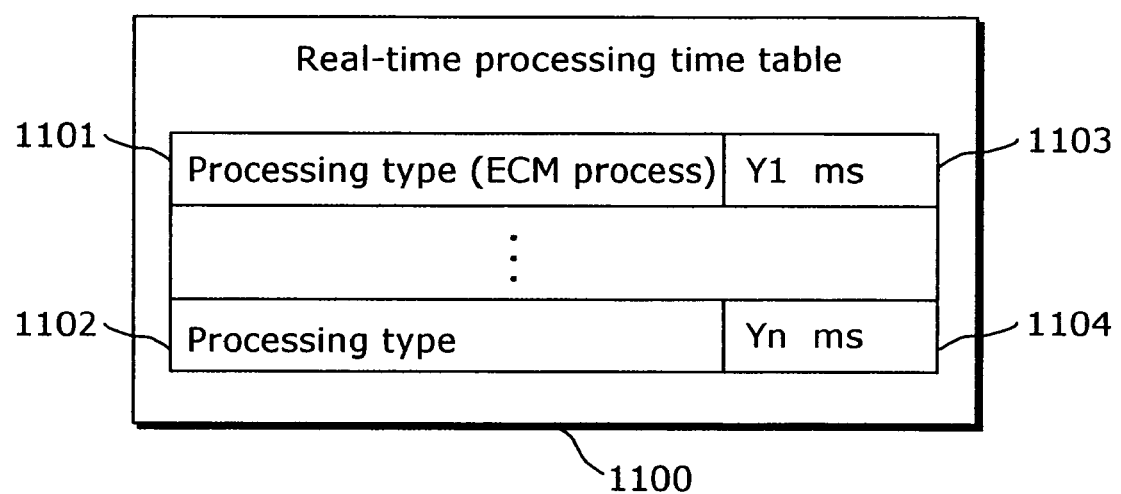
FIG. 13 is a diagram showing one example of a real-time processing time table which is referred to by the IC card for calculating a time period which can be spent for non-real-time processing.

FIG. 13 is a diagram showing one example of a real-time processing time table which is referred to by the IC card 300 for calculating the time period which can be spent for non-real-time processing. A method of calculating the time period which the IC card 300 can spend for non-real-time processing is described below with reference to FIG. 13.

First, a description is given of a method of managing the time required for the receiver 200 to perform real-time processing. A real-time processing time table 1100 includes processing types 1101 and 1102 for identifying the types of real-time processing and processing time 1103 and 1104 required for respective types of real-time processing. For example, the time for performing ECM processing which needs to be performed in real time in CAS is Y1 ms. The processing time management unit 210 of the receiver 200 manages this real-time processing time table 1100.

Next, a description is given of a method of calculating the time period in which non-real-time processing can be performed in the IC card 300. The receiver 200 calculates the process-executable time period which can be spent for non-real-time processing in between the real-time processing in the IC card 300 from "(Ks 902 update time interval)−(Time required for real-time processing)".

Therefore, if the IC card 300 completes non-real-time processing within the process-executable time period which can be used for the non-real-time processing, it becomes possible to perform real-time processing without difficulty. So a mechanism is needed for completing, within the process-executable time period, the non-real-time processing in the IC card in between real-time processing. A description is given of the respective operations of the receiver 200 and the IC card 300 for embodying this mechanism.

Figure 14:
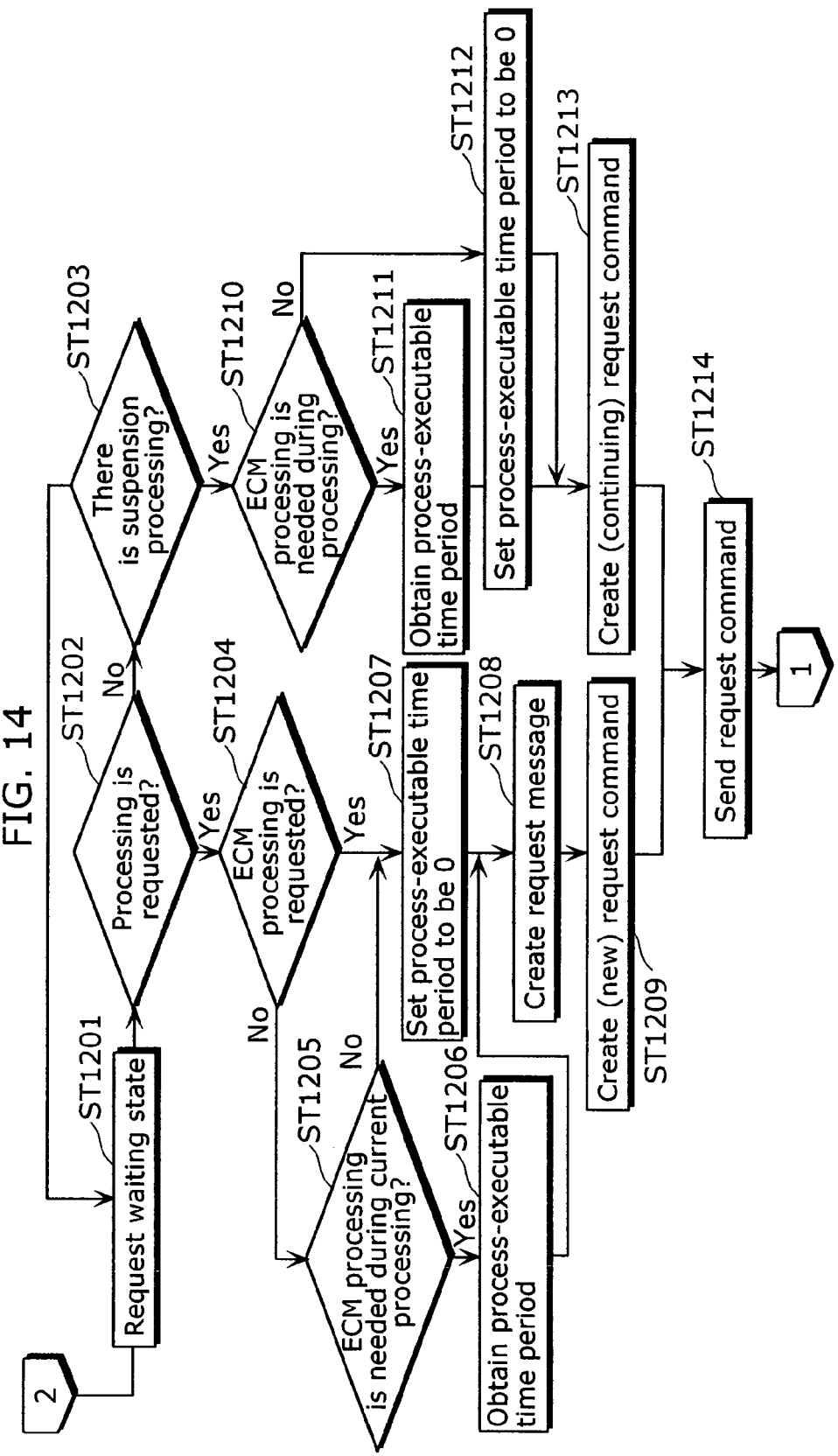
FIG. 14 is a flowchart showing a processing procedure for the receiver from its request waiting state until its transmission of a request command to the IC card.
Figure 15:
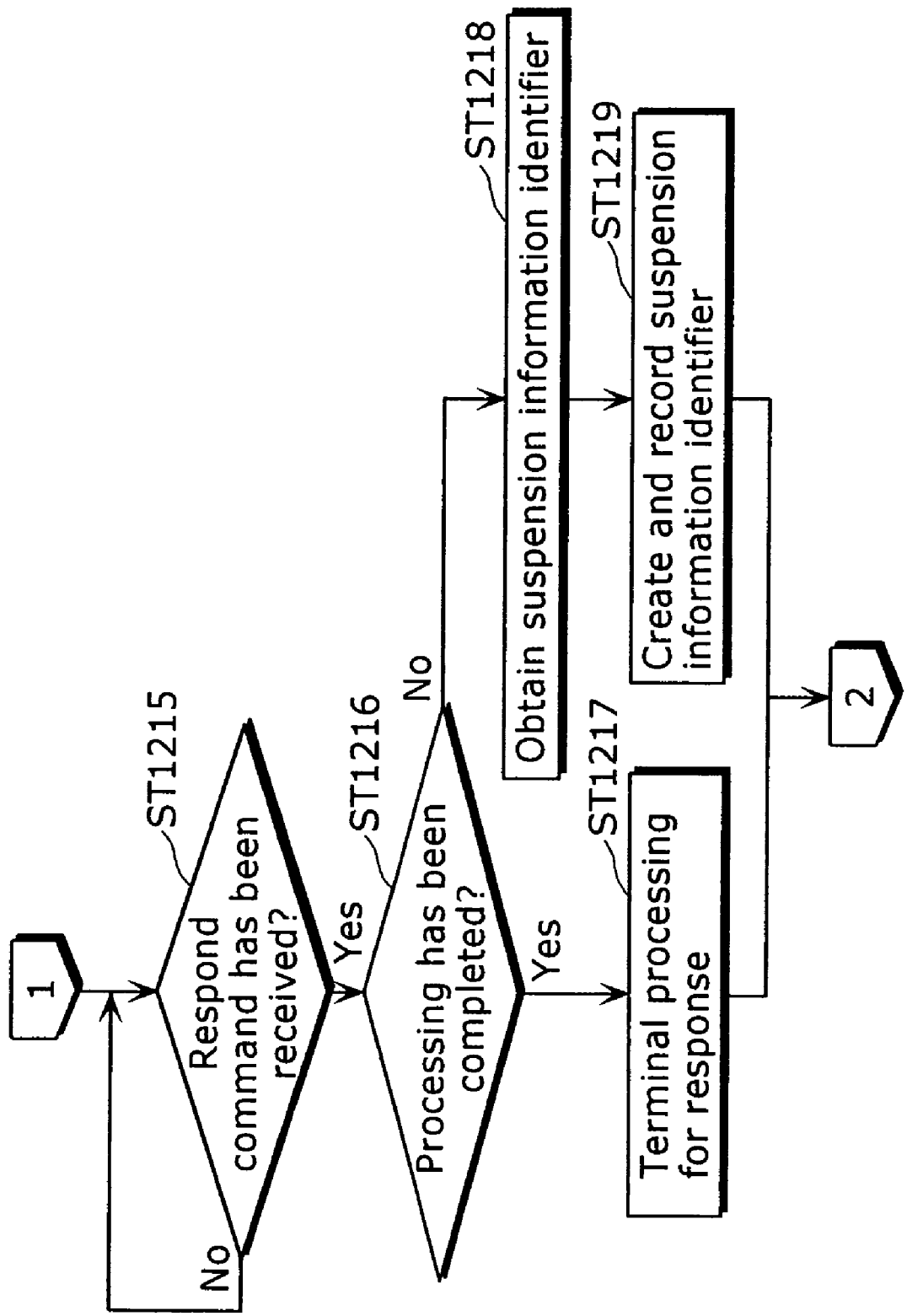
FIG. 15 is a flowchart showing a processing procedure for the receiver from its transmission of the request command to the IC card until its completion of processing corresponding to a response command.

FIG. 14 is a flowchart showing a processing procedure for the receiver 200 from its request waiting state until its sending of a request command to the IC card 300. FIG. 15 is a flowchart showing a processing procedure for the receiver 200 from its sending of the request command to the IC card 300 until its completion of processing corresponding to the response command. First, the operations of the receiver 200 are described with reference to FIG. 14 and FIG. 15.

First, it is assumed that the receiver 200 is previously activated and is in a request waiting state in ST1201.

Next, after the receiver receives some events such as the actions of the timer and the user, the control unit 205 judges in ST1202 whether the processing in the IC card 300 is needed or not. Here, in the case where the processing in the IC card 300 is not needed, the receiver goes to ST1203, and in the case where the processing in the IC card 300 is needed, it goes to ST1204.

First, the case where the processing in the IC card 300 is needed is described below. In ST1204, the control unit 205 judges whether the subject to be processed is real-time processing or not. Since the following description is given of the ECM processing that is the CAS real-time processing as an example, the control unit 205 judges whether or not the ECM processing request is received from the demultiplexing unit 202. In the case where it is not the ECM processing as a result of the judgment, it goes to ST1205, and in the case of the ECM processing, it obtains the ECM delivered from the demultiplexing unit 202 and goes to ST1207.

In the case where it is not the ECM processing, the control unit 205 judges, in ST1205, whether or not it is necessary for the IC card 300 to switch the real-time processing during the processing of the request. The control unit 205 makes this judgment based on whether or not a content is now being viewed using CAS or whether another content is now being recorded in the background using CAS. Note that "background recording" denotes recording of a content received in the background during viewing another content. In the case where the CAS content is not being viewed nor another content is not being recorded in the background, the ECM processing does not need to be performed in the IC card 300, so the receiver 200 judges that the switching processing is not necessary in the IC card 200 and goes to ST1207. In the case where the CAS content is now being viewed or another content is being recorded in the background, the ECM processing needs to be performed in the IC card 300, so it goes to ST1206.

In ST1206, the receiver 200 calculates the time period which the IC card 300 can spend for non-real-time processing. This calculation method is described above, and the control unit 205 obtains the real-time processing time table 1100 from the processing time management unit 210. Next, it obtains the time (Y1 ms) 1103 required for the ECM processing 1101. Then, the control unit 205 calculates the process-executable time period which can be spent for that ECM processing by subtracting the Y1 ms from X ms that is the update interval 1003 of Ks 902. In the present embodiment, the value of "the minimum time interval of ECM update" defined in the above-mentioned non-patent literature 1 shall be used as this update interval (X ms) of the Ks 902, but what is used as the update interval is not particularly limited here.

Next, a description is given of the processing performed in the case where it is judged in ST1204 that the ECM processing is requested.

Since the ECM processing needs to be performed in real time without suspension, the control unit 205 does not set the process-executable time period in the IC card 300. Therefore, in ST1207, the process-executable time period shall be the value "0" which means that "the process-executable time period is not set".

Next, in ST1208, the request message 400 for the request processing is created. The control unit 205 sets various parameters necessary for the request, in the message processing unit 209, so as to have it create the corresponding request message 400.

In ST1209, the control unit 205 creates the command APDU 500 to be sent to the IC card 300. The control unit 205 sets the request message 400 created in ST1208, the process-executable time period calculated in ST1206 or ST1207, and the processing flag specifying new processing. The communication data processing unit 208 stores the set process-executable time period into the process-executable time period 508, the set processing flag into the processing flag 509, and the set request message 400 into the processing information 510, respectively, in the data area 506, so as to create the command APDU 500. Note that the IC card 300 is notified here that the above processing is real-time processing and thus there is no need to divide that processing using "process-executable time period=0" but it may be notified using a flag or the like, and such notification does not particularly limit the present invention.

Next, a description is given of the processing performed in the case where there is suspension processing in ST1203. The control unit 205 inquires the suspension information management unit 211 about whether the suspension processing is performed or not. The suspension information management unit 211 obtains the suspension information identifier table 700 from the suspension processing DB 206, and checks whether or not the suspension processing is described therein. In the case where there is no suspension processing, it goes to ST1201. In the case where there is the suspension processing, it obtains the suspension information identifier and the processing type and returns them to the control unit 205. Then, the suspension information management unit 211 deletes, from the suspension information identifier table 700, the suspension information identifier and the processing type returned to the control unit 205, and records the suspension information identifier table 700 in the suspension information DB 206 again.

The control unit 205 judges in ST1210 whether or not real-time processing needs to be switched in the IC card 300 during the continuing processing of non-real-time processing. There is no need to perform the ECM processing in the IC card 300 in the case where a content is not now being viewed nor recorded in the background using CAS, so the control unit 205 judges that the switching processing is not necessary in the IC card 300 and goes to ST1212. The ECM processing needs to be performed in the IC card 300 in the case where a content is now being viewed or recorded in the background using CAS, so it goes to ST1211.

The processing in ST1211 is same as that in ST1206, and the time period which the IC card 300 can spend for non-real-time processing is calculated. Since the calculation method is same as that in ST1206, it is not repeated here.

Since the processing in ST1212 is also same as that in ST1207, it is not repeated here.

Next, in ST1213, the command APDU 500 for resuming the suspended processing is generated. The control unit 205 sets, in the communication data processing unit 208, the process-executable time period calculated in ST1211 or ST1212, the suspension information identifier obtained in ST1203 and the processing flag indicating the continuation of the processing. The communication data processing unit 208 stores the set process-executable time period, the set processing flag and the set suspension information identifier into the process-executable time period 508, the processing flag 509 and the processing information 510, respectively, in the data area 506, so as to generate the command APDU 500.

In ST1214, the control unit 205 sends the command APDU 500 generated in ST1209 and ST1213 to the IC card 300 via the communication unit 207.

The following description is given with reference to the flowchart in FIG. 15. After that, in ST1215, the control unit 205 waits for the response APDU 520 that is a response from the IC card 300. In the case where the IC card 300 performs the processing and sends back the response APDU 520, the control unit 205 goes to ST1216.

In ST1216, the receiver 200 judges whether the IC card 300 has completed non-real-time processing or suspends the processing in a midway process block. The control unit 205 sets, in the communication data processing unit 208, the response APDU 520 obtained via the communication unit 207. Next, the control unit 205 obtains the processing status flag 523 from the communication data processing unit 208. Here, the control unit 205 executes the processing of ST1217 when the processing status flag 523 indicates the completion of the processing, and executes the processing of ST1218 when it indicates the suspension of the processing.

First, a description is given of the processing performed in ST1217 in the case where the processing is completed.

The control unit 205 obtains the response message 410 from the communication data processing unit 208, and sets it in the message processing unit 209. The control unit 205 performs the corresponding processing based on various result information stored in the response message 410 set in the message processing unit 209. For example, in the case where the request for the IC card 300 is the processing for obtaining the Ks 902 from ECM, the control unit 205 sets the obtained Ks 902 in the decryption unit 203, and resumes decryption of the content. After the above-mentioned processing, the control unit 205 returns to ST1201 shown in FIG. 14.

Next, a description is given of the processing performed in ST1218 in the case where the processing is suspended.

The control unit 205 obtains the suspension information identifier from the communication data processing unit 208. Then, in ST1219, the control unit 205 associates the obtained suspension information identifier with the processing type for identifying the corresponding processing, and sets them in the suspension information management unit 211. The suspension information management unit 211 adds the above set information in association with each other into the suspension identifier table 700 held in the suspension information DB 206, and records it in the suspension information DB 206 again. After the completion of the recording, the control unit 205 returns to ST1201.

Figure 16:
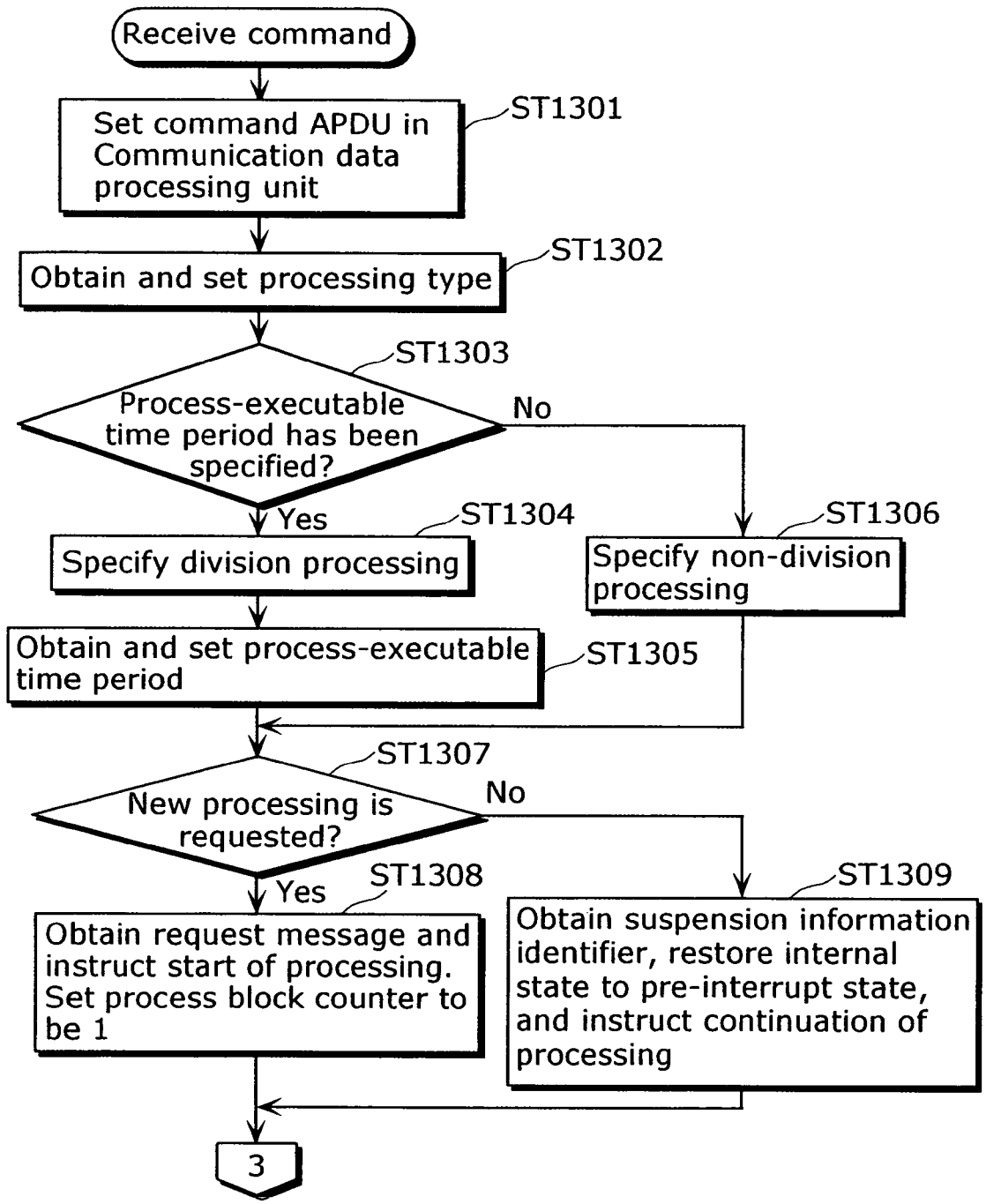
FIG. 16 is a flowchart showing operations of the IC card from its reception of the request command until its execution of the processing for the request command.
Figure 17:
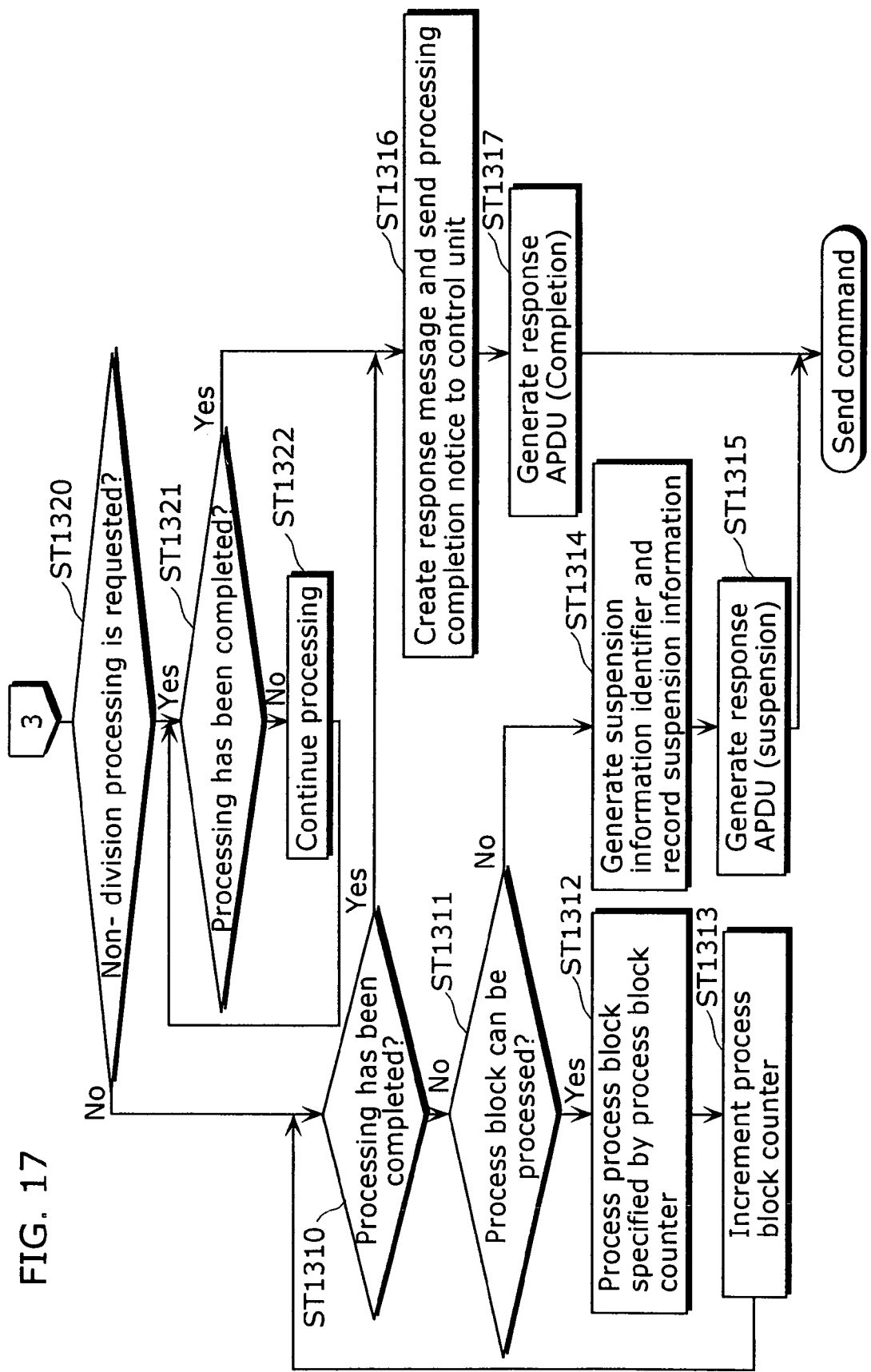
FIG. 17 is a flowchart showing operations of the IC card from its judgment of the completion of the processing for the request command until its transmission of the response command to the receiver.

FIG. 16 is a flowchart showing the operations of the IC card 300 from its reception of the request command until its execution of the processing for the request command. FIG. 17 is a flowchart showing the operations of the IC card 300 from its judgment of the completion of the processing for the request command until its sending of the response command to the receiver 200. Next, the operations of the IC card 300 are described with reference to FIG. 16 and FIG. 17.

In ST1301, the IC card 300 starts the processing upon receipt of the command APDU 500 sent from the receiver 200.

First, in ST1301, the control unit 303 obtains the command APDU 500 received via the communication unit 301. Then, the control unit 303 sets the obtained command APDU 500 in the communication data processing unit 302.

Next, in ST1302, the control unit 303 obtains, from the communication data processing unit 302, the processing type requested by the receiver 200. The communication data processing unit 302 obtains INS 502 in the set command APDU 500, and returns it as the processing type to the control unit 303. The control unit 303 sets the obtained processing type in the processing time management unit 304.

Next, in ST1303, the control unit 303 inquires the communication data processing unit 302 whether the process-executable time period is specified or not when performing the processing requested by the receiver 200. In the case where a value is stored in the process-executable time period 508, the communication data processing unit 302 notifies the control unit 303 that the process-executable time period is specified, and in the case where "0" is stored, it notifies the control unit 303 that the process-executable time period is not specified. Based on the notified result, the control unit 303 goes to ST1304 when the process-executable time period is specified, and goes to ST1306 when it is not specified.

First, the case where the process-executable time period is specified is described.

In ST1304, the control unit 303 notifies the processing time management unit 304 that the processing needs to be divided because the process-executable time period is specified. The processing time management unit 304 obtains, from the processing information DB 305, the processing time information 600 corresponding to the processing type set in ST1302.

In ST1305, the control unit 303 obtains the process-executable time period 508 from the communication data processing unit 302, and sets it in the processing time management unit 304. The communication data processing unit 302 obtains the process-executable time period 508 and returns it to the control unit 303. The processing time management unit 304 holds the set process-executable time period in itself.

Next, the case where the process-executable time period is not specified is described.

In ST1306, the control unit 303 notifies the processing time management unit 304 that there is no need to divide the processing because the process-executable time period is not specified and thus the processing can be performed in whole (without being divided). The processing time management unit 304 deletes the processing time information 600 held in itself.

In ST1307, the control unit 303 inquires the communication data processing unit 302 about whether the receiver 200 requests to start new processing or to continue the suspended processing. The communication data processing unit 302 judges whether the processing specified with the processing flag 509 is new processing or continuing processing, and returns the judgment result to the control unit 303. The control unit 303 goes to ST1308 in the case where the start of new processing is requested, while it goes to ST1309 in the case where the continuation of processing is requested.

First, the case where the start of new processing is requested is described.

In ST1308, the control unit 303 obtains the request message 400 from the communication data processing unit 302. Next, the control unit 303 sets the obtained request message 400 in the request processing unit 306 and instructs it to start the processing. The request processing unit 306 causes the message processing unit 307 to interpret the set request message 400 so as to obtain the details of the processing, the parameters necessary for the processing and the like. Next, it sets the process block counter held in itself to be "1", and then goes to ST1310.

Next, the case where the continuation of the suspended processing is requested is described.

In ST1309, the processing for returning the internal state to the pre-suspension state is performed in order to continue the processing which has been suspended. First, the control unit 303 obtains the suspension information identifier from the communication data processing unit 302. The communication data processing unit 302 sends the value stored in the processing information 510, as the suspension information identifier, back to the control unit 303. Then, the control unit 303 sets the obtained suspension information identifier in the suspension information management unit 308, and obtains the corresponding suspension information (which includes the processing type 801, the process block counter 802, various parameters 803 and the like). More specifically, the suspension information management unit 308 obtains the suspension information table 800 from the suspension information DB 309, obtains the suspension information corresponding to the suspension information identifier, and sends them back to the control unit 303. Also, it deletes, from the suspension information table 800, the entry of the obtained suspension information and the suspension information identifier corresponding to that information, and records the suspension information table 800 after deleting into the suspension information DB 309. The control unit 303 restores the internal state to the pre-suspension state using the suspension information holding the obtained various parameters, and then instructs the request processing unit 306 to continue the processing.

After making preparations for the above processing start, the request processing unit 306 starts the processing instructed by the receiver 200.

A description is given below with reference to the flowchart in FIG. 17. First, in ST1320, the request processing unit 306 checks whether or not the processing time management unit 304 holds the processing time information 600, and judges whether the requested processing is non-division processing or not. When it is judged that the requested processing is non-division processing, the request processing unit 306 goes to ST1321, and when it is judged that the requested processing is not non-division processing, it goes to ST1310. First, the case where the requested processing is non-division processing is described. In ST1321, the request processing unit 306 further judges whether the non-division processing has been completed or not, and if the non-division processing has not yet been completed, it continues the non-division processing in ST1322 and returns to ST1321. If the non-division processing has been completed, the request processing unit 306 goes to the processing in ST1316.

In the case where the processing requested in ST1320 is not non-division processing, it goes to the processing in ST1310. In ST1310, the request processing unit 306 judges whether the processing has been completed or not. If the processing has been completed, it goes to ST1316. If the processing has not yet been completed, it goes to ST1311.

First, the case where the processing has not yet been completed is described.

In ST1311, the request processing unit 306 sets, in the processing time management unit 304, the value of the process block counter held in itself, and inquires the processing time management unit 304 about whether or not it is possible to process the corresponding process block. The processing time management unit 304 obtains, from the processing time information 600 held in itself, the processing time required for processing the block of the corresponding number. Next, the processing time management unit 304 compares the process-executable time period held in itself with the required processing time. Here, in the case where "process-executable time period≧required processing time", the processing time management unit 304 notifies the request processing unit 306 that that block can be processed, calculates "process-executable time period=process-executable time period−required processing time", and then updates the process-executable time period held in itself. On the other hand, in the case where "process-executable time period<required processing time", it notifies that it is not possible to continue the processing. When notified that the block can be processed, the request processing unit 306 goes to ST1312, while when notified that it is not possible to continue the processing, it goes to ST1314.

First, a description is given of the operations for the case where it is notified that the blocks can be processed.

In ST1312, the request processing unit 306 processes the process blocks specified by the process block counter.

Next, in ST1313, the request processing unit 306 increments the processing counter held in itself by one, and returns to ST1310 to judge the termination of the processing or to check whether or not it is possible to process the next process block.

Next, a description is given of the operations for the case where it is notified that it is not possible to continue the processing.

In ST1314, the request processing unit 306 notifies the control unit 303 to record the suspension information. The control unit 303 obtains the internal state from the request processing unit 306 based on the above notification. Then, it sets the obtained internal state in the suspension information management unit 308 and instructs it to store the internal state as suspension information. The suspension information management unit 308 assigns the suspension information identifier to the set suspension information, and writes this additional information into the suspension information table 800 held in the suspension information DB 309. After the above processing, the suspension information management unit 308 returns the generated suspension information identifier to the control unit 303.

In ST1315, the control unit 303 sets, in the communication data processing unit 302, the processing status flag indicating the suspension of the processing and the suspension information identifier obtained in ST1314 so as to instruct the communication data processing unit 302 to generate the response APDU 520. The communication data processing unit 302 stores the set processing status flag into the processing status flag 523, and the set suspension information identifier into the result information 525, and stores the size of the suspension information identifier into the data size 524. Next, it stores the status code indicating the normal termination into SW1/SW2 (522), and returns the created response APDU 520 to the control unit 303.

Next, a description is given of the operations for the case where the processing has been completed.

First, in ST1316, the request processing unit 306 sets the processing result in the message processing unit 307 so as to instruct the message processing unit 307 to create a response message 410. The message processing unit 307 stores the message ID of the response message to the request message 400 set in ST1308 into the message ID 411, the size of the set result information into the message size 412, and the set result information into the result information 413, so as to create the response message 410. The request processing unit 306 obtains the response message 410 from the message processing unit 307, and sends the response message 410, together with the processing completion notice, to the control unit 303.

In ST1317, the control unit 303 generates the response APDU 520.

First, the control unit 303 sets the processing completion notice received in ST1316 and the response message 410, as a processing status flag and a processing response, respectively, in the communication data processing unit 302, so as to cause the communication data processing unit 302 to create the response APDU 520, and obtains it. The communication data processing unit 302 stores the set processing status flag into the processing status flag 523, the size of the set processing response into the data size 524, the set processing response into the processing response 525, and the status code indicating the normal termination into SW1/SW2 (522), respectively, and returns the created response APDU 520 to the control unit 303.

The control unit 303 sends the response APDU 520 generated in ST1315 and ST1317 to the receiver 200 via the communication unit 301.

As described above, the receiver 200 sets the process-executable time period for the processing which the receiver 200 requests the IC card 300 to perform, so it becomes possible for the receiver 200 to cause the IC card 300 to perform real-time processing and non-real-time processing by switching between them.

Note that in the present embodiment, the IC card 300 is described as an example, but the present invention is not limited to this IC card. For example, an LSI, a board or the like incorporated into the receiver 200 may replace the IC card 300.

Note that the receiver 200 notifies the IC card 300 of the process-executable time period 508 as a condition for suspending the processing, but it may notify the other conditions. For example, it is also possible to specify, using a division flag, "processing of one process block without division" in the command APDU 500, so as to control the range of processing which the IC card 300 can perform within a process-executable time period. In addition, as for specification of a range of processing, it is possible to specify the range so that one process block is always processed without division, or to specify the number of as many process blocks as possible that the IC card 300 can process within the process-executable time period.

The IC card 300 judges whether or not it can complete the next processing within the process-executable time period every time it completes the processing of one process block. However, it is possible to make this judgment by measuring, using a timer or the like, the accumulated time of the processing of respective process blocks from the start of the non-real-time processing, and comparing the time required for the processing of the next process block with the remaining time obtained by subtracting the accumulated time from the process-executable time period. Or, it is also possible to judge whether the IC card 300 can complete the next processing within the process-executable time period by reading the time required for the processing of each process block from the processing time information and adding them, and comparing the added time with the process-executable time period.

Note that although the IC card 300 divides processing into data blocks per function here, it may divide the processing into data units per time period.

Note that although the IC card 300 judges in ST1311 whether it can process the next process block within a predetermined time period here, the receiver 200 may make this judgment. In other words, it is possible for the receiver 200 to obtain the processing time information 600 held in the IC card 300 and directly specify the range of process blocks to be processed, namely, the process blocks that can be processed within the process-executable time period. In addition, the processing time information 600 may be obtained from the IC card 300 to be used, or from other devices and media and the like.

Note that it is possible to structure the processing time information 600 held in the IC card 300 so that it can be updated. For example, in the case where a part or all of the application on the IC card 300 is updated via the Internet, the processing speed in the IC card 300 may change. It becomes possible to support even such a case by updating the processing information 600.

Note that the IC card 300 may hold a plurality of processing time information 600 for one processing. The processing capability of the IC card 300 varies depending on the supplied operating frequency. Therefore, it becomes possible to select, for the proper operation, the processing time information 600 which is referred to, depending on the supplied frequency.

Note that the suspension information identifier generated by the IC card 30 in ST1314 is used for identification of suspension processing, but this identifier may be generated by the receiver 200. In this case, the receiver 200 notifies the IC card 300 of the generated suspension information identifier, using the command APDU 500.

Note that the IC card 300 can hold suspension information for each suspended processing, but the IC card 300 may hold only one suspension information. In this case, there is no need to provide a mechanism for selecting the suspended processing which is to be resumed, using the suspension information identifier. In the case where only one suspension information is held for each type of processing, there is no need to use the suspension information identifier as well. That is why, in this case, it is possible to uniquely identify the processing to be continued, based on the INS 502 and the processing flag 509 of the command APDU 500.

Note that the IC card 300 stores the suspension information into the suspension information DB 309, but the receiver 200 may hold it. In this case, the IC card 300 returns the suspension information, instead of the suspension information identifier, in the response for the case where the processing is suspended. The receiver 200 manages the returned suspension information, instead of the suspension information identifier in the suspension information identifier table 700, and transmits the suspension information to the IC card 300 using the command APDU 500, when it causes the IC card 300 to continue the processing.

Note that in the case where the receiver 200 manages suspension information and there is suspended processing in ST 1203, the receiver 200 always resumes the suspended processing, but it may cancel the processing. In this case, it may store the value indicating "process cancelled" into the processing flag 509 of the command APDU 500 and store the suspension information identifier to be cancelled into the processing information 510. Also, in the case where the IC card 300 holds the suspension information, it may cancel the processing by operating in the same manner. In the case where two or more types of processing are suspended, it may set priorities to resume the processing depending on the types of the processing.

As described above, the method according to the present invention of performing a plurality of processing by switching between them in a single task device such as an IC card is useful in the case where a plurality of services are used in a single IC card or the like.

Figure 18:
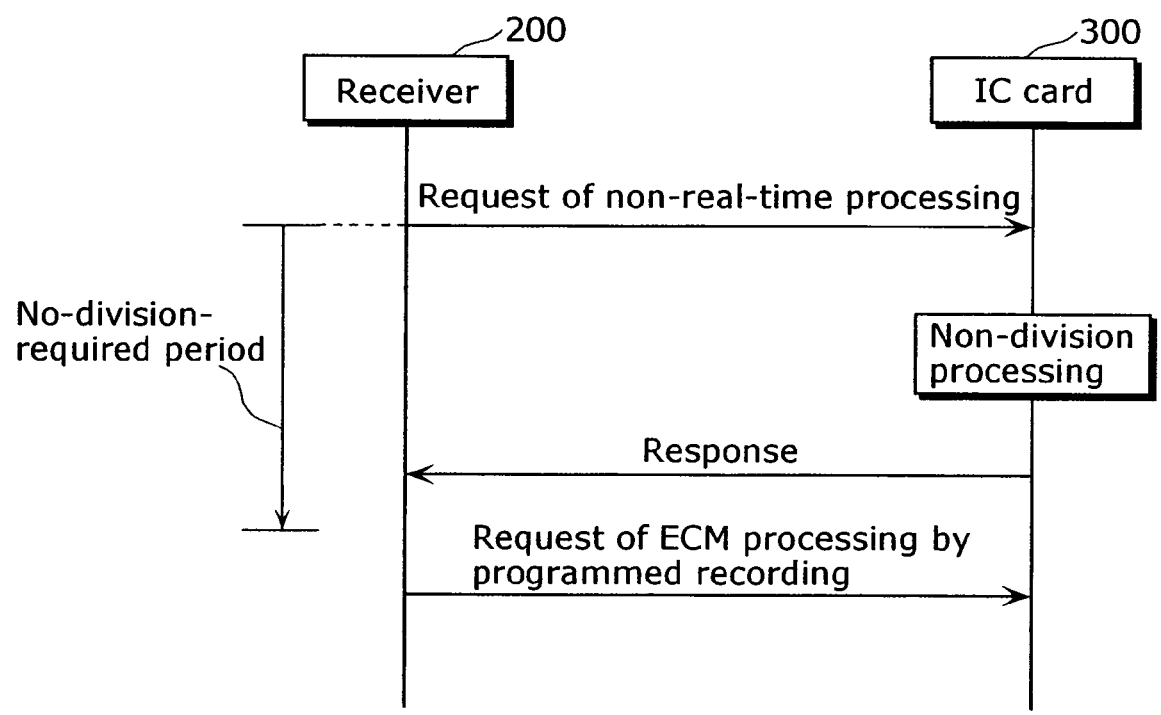
FIG. 18 is a diagram showing one example of a criterion for judging whether non-real-time processing is performed after being divided in the case where CAS programmed recording is set.

Note that in the above embodiment, the example is described where non-real-time processing is divided into process blocks in such a case where a content distributed via digital broadcast is recorded in the background while the receiver 200 and the IC card 300 are reproducing a storage content or the like according to the usage rule, but the present invention is not limited to that example. For example, also in the case where a content distributed via CAS is programmed to be recorded while the receiver 200 and the IC card 300 are reproducing a storage content according to the usage rule, the IC card 300 divides non-real-time processing into blocks if ECM processing needs to be performed during the non-real-time processing. FIG. 18 is a diagram showing one example of a criterion for judging whether non-real-time processing is to be performed after being divided in the case where CAS programmed recording is set. As shown in FIG. 18, in the case where the control unit 205 performs non-real-time processing in the IC card 300, it judges the necessity of switching processing depending on whether or not programmed recording is set during a no-division-required period in which the processing does not need to be divided for processing (for example, a period of time from the start of the non-real-time processing until the lapse of the maximum processing time required for the non-division processing of the non-real-time processing). More specifically, if CAS programmed recording is set during the no-division-required period, the control unit 205 instructs division of the non-real-time processing. Note that the control unit 205 may hold the no-division-required period in advance or obtain that period from the IC card 300, and from where the control unit 205 obtains the period is not particularly limited.

INDUSTRIAL APPLICABILITY

According to the IC card processing method of the present invention, it becomes possible to perform a plurality of processing by switching between them and thus to reduce costs and improve user convenience. Therefore, the present invention is useful as a receiver in a content distribution service using an IC card.

The receiver of the present invention is useful as a receiver in a received data processing system in which reproduction of a content stored inside or a content received via a communication network is performed concurrently with reception of a digital broadcast. The IC card of the present invention is useful as an IC card in a received data processing system in which reproduction of a content stored inside or a content received via a communication network is performed concurrently with reception of a digital broadcast.

What is claimed is:

1. A processing terminal in a received data processing system comprising a receiving terminal and said processing terminal, the received data processing system being intended for receiving real-time process data at a predetermined timing and processing the real-time process data in real time, and for processing non-real-time process data in between the real-time processing, the real-time process data being data which needs to be processed in real time, and the non-real-time process data being data which does not need to be processed in real time, said processing terminal comprising:
a communication unit operable to receive the real-time process data and the non-real-time process data from said receiving terminal, the non-real-time process data being received with time information that indicates a time period which can be spent for the processing of the non-real-time process data;
a processing unit operable to divide the processing of the non-real-time process data into a plurality of process blocks; and
a storing unit operable to store processing time information, the processing time information including a plurality of required processing times, each of the plurality of the required processing times indicating one time period required by the processing terminal to process each of the plurality of the divided process blocks,
wherein said processing unit is operable to determine how many of the plurality of the required processing times fall within the time period indicated by the time information based on the processing time information, and to process a number of the divided process blocks within the time period which can be spent for processing of the non-real-time process data, the number of the divided process blocks being corresponded to a number of the plurality of the required processing times that are determined to fall within the time period indicated by the time information,
wherein said communication unit is operable to send a result of the non-real-time processing performed within the time period back to said receiving terminal.

2. The processing terminal according to claim 1, wherein said processing unit includes a processing time measurement unit operable to measure a total time period which has been actually used for the processing of the divided process blocks, and
wherein said processing unit is operable to judge whether or not a new process block can be processed within a remaining time period that is a difference between the time period indicated by the time information and the measured total time period, and to process as many process blocks that can be processed within the time period indicated by the time information.

3. The processing terminal according to claim 1, wherein said processing division unit is operable to divide the processing of the non-real-time process data into data units per function of the non-real-time processing, wherein said storing unit further includes a processing time table holding unit operable to hold a processing time table that indicates a time period required for the processing of each process block, and
wherein said processing unit is operable to process as many process blocks that can be processed within the time period indicated by the time information, based on the processing time table.

4. The processing terminal according to claim 1, wherein said processing division unit is operable to divide the processing of the non-real-time process data into data units per predetermined processing time period, and
wherein said processing unit is operable to calculate a number of process blocks which can be processed during the time period indicated by the time information, based on the predetermined processing time period, and to process the calculated number of process blocks.

5. The processing terminal according to claim 1, wherein said communication unit is further operable to receive, from said receiving terminal, a division flag that instructs division of processing of non-real-time process data into process blocks, and
wherein said processing division unit is operable to divide the processing of the non-real-time process data when said communication unit receives the division flag.

6. The processing terminal according to claim 5, wherein said processing unit is operable to process as many process blocks that can be processed within the time period indicated by the time information, when said communication unit receives the division flag, and to perform the processing of the non-real-time process data without being divided, when said communication unit does not receive the division flag.

7. The processing terminal according to claim 5, wherein said processing unit is operable to process only one of the divided process blocks when said communication unit receives the division flag.

8. The processing terminal according to claim 1, wherein said processing unit is operable to process as many process blocks that can be processed within the time period indicated by the time information, and to suspend the processing of the non-real-time process data including the process blocks and to process the real-time process data in the case where the processing of the non-real-time process data has not been completed.

9. The processing terminal according to claim 8,
wherein said communication unit is operable to notify said receiving terminal that the processing of the non-real-time process data has been suspended when the processing has been suspended, and to notify that the processing of the non-real-time process data has been completed when the processing has been completed.

10. The processing terminal according to claim 8,
wherein said processing unit further includes a suspension state holding unit operable to generate and hold suspension information that indicates a state of the processing of the non-real-time process data at a point of time when the processing is suspended, and
wherein said processing unit is operable to resume the processing of the non-real-time process data from the state at the time of the suspension indicated by the suspension information after the processing of the real-time process data has been completed.

11. The processing terminal according to claim 8,
wherein said processing unit is operable to perform the processing of the real-time process data without being divided into process blocks.

12. The processing terminal according to claim 1,
wherein said communication unit is operable to receive, from said receiving terminal, non-real-time process data which is divided into process blocks,
wherein said processing unit includes a processing time measurement unit operable to measure a total time period which has been actually used for the processing of the divided process blocks, and
wherein said processing unit is operable to judge whether or not a new process block can be processed within a remaining time period that is a difference between the time period indicated by the time information and the measured total time period, and to process as many process blocks that can be processed within the time period indicated by the time information.

13. The processing terminal according to claim 1,
wherein said communication unit is operable to receive, from said receiving terminal, non-real-time process data which is divided into process blocks,
wherein said storing unit is operable to store a processing time table that indicates a time period required for the processing of each process block, and
wherein said processing unit is operable to process as many process blocks that can be processed within the time period indicated by the time information, based on the received processing time table.

14. The processing terminal according to claim 1,
wherein said processing unit further includes a time calculation unit operable to calculate a time period which can be spent for the processing of the non-real-time process data, based on an interval at which the real-time process data is received, and
wherein said processing unit is operable to process as much of the non-real-time process data as possible within the calculated time period.

15. The processing terminal according to claim 1,
wherein said processing unit further includes a processing division unit operable to divide the processing of the non-real-time process data into process blocks,
wherein said communication unit is farther operable to receive, from said receiving terminal, a division flag that instructs division of processing of non-real-time process data into process blocks, and
wherein said processing division unit is operable to divide of processing of the non-real-time process data into process blocks when said communication unit receives the division flag, and
wherein said processing unit is operable to process as many process blocks that can be processed within a predetermined time period.

16. A receiving terminal in a received data processing system comprising said receiving terminal and a processing terminal, the received data processing system being intended for receiving real-time process data at a predetermined timing and processing the real-time process data in real time, and for processing non-real-time process data in between the real-time processing, the real-time process data being data which needs to be processed in real time, and the non-real-time process data being data which does not need to be processed in real time, said receiving terminal comprising:
    a receiving unit operable to receive real-time process data and non-real-time process data from an external apparatus;
    a non-real-time processing time calculation unit operable to calculate a time period which can be spent for processing of the non-real-time process data; and
    a sending unit operable to send the real-time process data and the non-real-time process data with the calculated time period to said processing terminal,
    wherein said processing terminal is operable to receive the real-time process data and the non-real-time process data with the calculated time period from said receiving terminal,
    wherein said processing terminal is operable to divide the processing of the non-real-time process data into a plurality of process blocks,
    wherein said processing terminal is operable to store processing time information, the processing time information including a plurality of required processing times, each of the plurality of the required processing times indicating one time period required by the processing terminal to process each of the plurality of the divided process blocks, and
    wherein said processing unit is operable to determine how many of the plurality of the required processing times fall within the time period indicated by the time information based on the processing time information, and to process a number of the divided process blocks within the time period which can be spent for processing of the non-real-time process data, the number of the divided process blocks being corresponded to a number of the plurality of the required processing times that are determined to fall within the time period indicated by the time information.

17. The receiving terminal according to claim 16, further comprising
    a judgment unit operable to judge, based on the calculated time period, whether or not the processing of the non-real-time process data needs to be divided, depending on whether or not real-time process data needs to be processed while said processing terminal is processing the non-real-time process data,
    wherein said sending unit is operable to send, to said processing terminal, a division instruction that indicates that the processing of the non-real-time process data needs to be divided into process blocks, when it is judged that the processing of the non-real-time process data needs to be divided.

18. The receiving terminal according to claim 17, further comprising an instruction acceptance unit operable to accept an instruction from a user, wherein the real-time process processing is processing of an entitlement control message (ECM) that includes a scramble key for decrypting an encrypted content which is received via broadcast, and wherein said judgment unit is operable to judge that the processing of the non-real-time process data needs to be divided, in the case where said instruction acceptance unit accepts an instruction of non-real-time processing during reproduction or recording of the encrypted broadcast content.

19. The receiving terminal according to claim 17, wherein said judgment unit is operable to judge that the processing of the non-real-time process data needs to be divided, in the case where said instruction acceptance unit accepts a programmed-recording instruction that instructs start of recording of the encrypted broadcast content before completion of the non-real-time processing.

20. The receiving terminal according to claim 16, further comprising a processing time table holding unit operable to previously hold a processing time table that indicates a time period required for processing of each of divided process blocks depending on a type of non-real-time processing, wherein said sending unit is operable to send, to said processing terminal, the non-real-time process data and information for identifying a process block to be processed.

21. The receiving terminal according to claim 20, further comprising a processing division unit operable to divide the processing of the non-real-time process data into process blocks based on the processing time table in the case where said judgment unit judges that the processing of the non-real-time process data needs to be divided.

22. The receiving terminal according to claim 16, further comprising:

a request command generation unit operable to generate a request command that requests said processing terminal to process non-real-time process data; and a processing result receiving unit operable to receive a result of processing of non-real-time process data and real-time process data from said processing terminal, wherein said request command generation unit is operable to generate the request command when said processing result receiving unit receives the result of the processing of the real-time process data from said processing terminal, and wherein said sending unit is operable to send the generated request command to said processing terminal.

23. The receiving terminal according to claim 16, further comprising:

a request command generation unit operable to generate a request command that requests said processing terminal to process non-real-time process data; and a key update detection unit operable to detect an update of an encryption key for real-time process data which is received from outside, wherein said request command generation unit is operable to generate the request command when the update of the encryption key is detected, and wherein said sending unit is operable to send the generated request command to said processing terminal.

24. The receiving terminal according to claim 17, further comprising a time information generation unit operable to generate time information that indicates the calculated time period, wherein said sending unit is further operable to send the time information.

25. A received data processing method for a processing terminal in a received data processing system comprising a receiving terminal and the processing terminal, the received data processing system being intended for receiving real-time process data at a predetermined timing and processing the real-time process data in real time, and for processing non-real-time process data in between the real-time processing, the real-time process data being data which needs to be processed in real time, and the non-real-time process data being data which does not need to be processed in real time, said received data processing method comprising:

receiving, at the processing terminal, the real-time process data and the non-real-time process data from the receiving terminal, the non-real-time process data being received with time information that indicates a time period which can be spent for the processing of the non-real-time process data;

dividing, at the processing terminal, the processing of the non-real-time process data into a plurality of process blocks;

storing, at the processing terminal, processing time information, the processing time information including a plurality of required processing times, each of the plurality of the required processing times indicating one time period required by the processing terminal to process each of the plurality of the divided process blocks;

determining, at the processing terminal, how many of the plurality of the required processing times fall within the time period indicated by the time information based on the processing time information;

processing, at the processing terminal, a number of the divided process blocks within a time period which can be spent for processing of the non-real-time process data, the number of the divided process blocks being corresponded to a number of the plurality of the required processing times that are determined to fall within the time period indicated by the time information; and sending, at the processing terminal, a result of the non-real-time processing performed within the time period back to the receiving terminal.

26. A received data processing method for a receiving terminal in a received data processing system comprising the receiving terminal and a processing terminal, the received data processing system being intended for receiving real-time process data at a predetermined timing and processing the real-time process data in real time, and for processing non-real-time process data in between the real-time processing, the real-time process data being data which needs to be processed in real time, and the non-real-time process data being data which does not need to be processed in real time, said received data processing method comprising:

receiving, at the receiving terminal, real-time process data and non-real-time process data from an external apparatus;

calculating, at the receiving terminal, a time period which can be spent for processing of the non-real-time process data;

sending, at the receiving terminal, the real-time process data and the non-real-time process data to the processing terminal;

receiving, at the processing terminal, the real-time process data and the non-real-time process data from the receiving terminal, the non-real-time process data being received with time information that indicates a time period which can be spent for the processing of the non-real-time process data;

dividing, at the processing terminal, the processing of the non-real-time process data into a plurality of process blocks;

storing, at the processing terminal, processing time information, the processing time information including a plurality of required processing times, each of the plurality of the required processing times indicating one time period required by the processing terminal to process each of the plurality of the divided process blocks;

determining, at the processing terminal, how many of the plurality of the required processing times fall within the time period indicated by the time information based on the processing time information; and processing, at the processing terminal, a number of the divided process blocks within a time period which can be spent for processing of the non-real-time process data, the number of the divided process blocks being corresponded to a number of the plurality of the required processing times that are determined to fall within the time period indicated by the time information.

27. A received data processing system comprising a receiving terminal and a processing terminal, said received data processing system being intended for receiving real-time process data at a predetermined timing and processing the real-time process data in real time, and for processing non-real-time process data in between the real-time processing, the real-time process data being data which needs to be processed in real time, and the non-real-time process data being data which does not need to be processed in real time, wherein said receiving terminal includes:

a real-time process data receiving unit operable to receive real-time process data;

a non-real-time process data receiving unit operable to receive non-real-time process data;

a time information generation unit operable to generate time information that indicates a time period which can be spent for processing of the non-real-time process data; and a first communication unit operable to send, to said processing terminal, the real-time process data, the non-real-time process data and the time information, wherein said processing terminal includes:

a second communication unit operable to receive the real-time process data, the non-real-time process data and the time information from said receiving terminal;

a processing unit operable to divide the processing of the non-real-time process data into a plurality of process blocks; and a storing unit operable to store processing time information, the processing time information including a plurality of required processing times, each of the plurality of the required processing times indicating one time period required by the processing terminal to process each of the plurality of the divided process blocks, wherein said processing unit is operable to determine how many of the plurality of the required processing times fall within the time period indicated by the received time information based on the processing time information, and to process a number of the divided process blocks within the time period indicated by the received time information, the number of the divided process blocks being corresponded to a number of the plurality of the required processing times that are determined to fall within the time period indicated by the received time information.

* * * * *

UNITED STATES PATENT AND TRADEMARK OFFICE
CERTIFICATE OF CORRECTION

PATENT NO. : 7,493,638 B2  
APPLICATION NO. : 11/090050  
DATED : February 17, 2009  
INVENTOR(S) : Takuji Hiramoto et al.

Page 1 of 1

It is certified that error appears in the above-identified patent and that said Letters Patent is hereby corrected as shown below:

Column 21

In line 64, claim 15, "farther" should read --further--.

Signed and Sealed this

First Day of September, 2009

David J. Kappos  
*Director of the United States Patent and Trademark Office*